United States Patent [19]

Ueda et al.

[11] Patent Number: 4,660,957
[45] Date of Patent: Apr. 28, 1987

[54] IMAGE FORMING APPARATUS WITH TWO MODE ORIGINAL HANDLING SYSTEM

[75] Inventors: Noriyoshi Ueda; Tadayuki Kitajima, both of Yokohama, Japan

[73] Assignee: Canon Kabushiki Kaisha, Tokyo, Japan

[21] Appl. No.: 672,389

[22] Filed: Nov. 16, 1984

[30] Foreign Application Priority Data

| Nov. 25, 1983 | [JP] | Japan | 58-221898 |
| Nov. 25, 1983 | [JP] | Japan | 58-221899 |
| Nov. 25, 1983 | [JP] | Japan | 58-221900 |
| May 1, 1984 | [JP] | Japan | 59-86236 |
| May 1, 1984 | [JP] | Japan | 59-86237 |
| May 1, 1984 | [JP] | Japan | 59-86238 |
| May 1, 1984 | [JP] | Japan | 59-86239 |
| May 1, 1984 | [JP] | Japan | 59-86240 |
| May 1, 1984 | [JP] | Japan | 59-86241 |
| May 1, 1984 | [JP] | Japan | 59-86242 |
| Jun. 1, 1984 | [JP] | Japan | 59-112760 |

[51] Int. Cl.$^4$ .......................................... G03G 15/00
[52] U.S. Cl. .................... 355/3 SH; 355/8; 355/50
[58] Field of Search ............... 355/3 SH, 8, 14 SH, 355/25, 50, 51, 75

[56] References Cited

U.S. PATENT DOCUMENTS

| 3,846,019 | 11/1974 | Yamagushi et al. | 355/3 |
| 3,955,888 | 5/1976 | Kakiuchi et al. | 355/1 |
| 4,281,919 | 8/1981 | Nomura et al. | |
| 4,367,947 | 1/1983 | Arter et al. | 355/75 |
| 4,368,977 | 1/1983 | Arter et al. | 355/75 |
| 4,505,574 | 3/1985 | Kurata et al. | 355/8 X |

FOREIGN PATENT DOCUMENTS 3653 2/1975 Japan.

Primary Examiner—A. T. Grimley
Assistant Examiner—J. Pendegrass
Attorney, Agent, or Firm—Fitzpatrick, Cella, Harper & Scinto

[57] ABSTRACT

This specification discloses an automatic original feeding device for automatically feeding an original to an optical processing station in an image forming apparatus body. The automatic original feeding device is characterized by original feeding means having a guide for guiding the original to the optical processing station, conveying means for conveying the original guided by the guide to the optical processing station, and drive transmitting means for driving the conveying means by movement of the original carriage of the image forming apparatus, and change-over means for selectively restraining the original feeding means with respect to the image forming apparatus body or the original carriage. The specification also discloses an image forming apparatus provided with such automatic original feeding device. The optical processing station refers to a station for optically processing the original, such as the exposure station of an electrophotographic copying apparatus or the reading station of a facsimile apparatus, an optical character reading apparatus or the like. The image forming apparatus refers to an apparatus for recording the surface of an original, such as an electrophotographic copying apparatus, a facsimile apparatus or an optical character reading apparatus. The original refers to a member having information to be recorded or transmitted.

21 Claims, 44 Drawing Figures

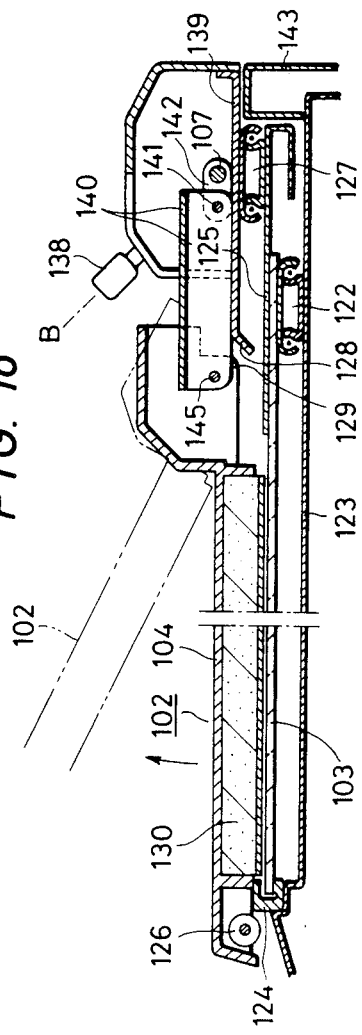
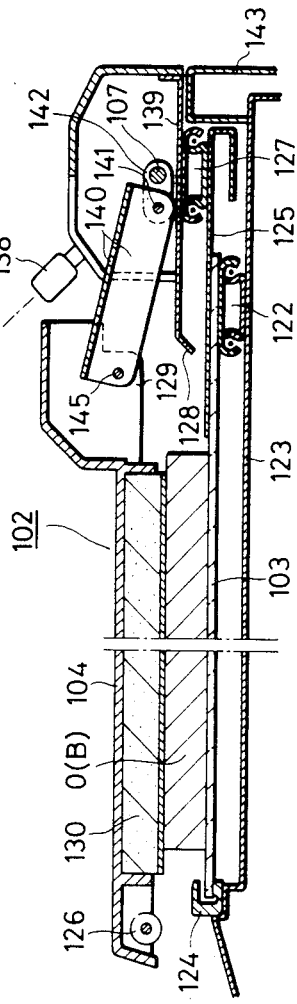

FIG. 20
FIG. 21
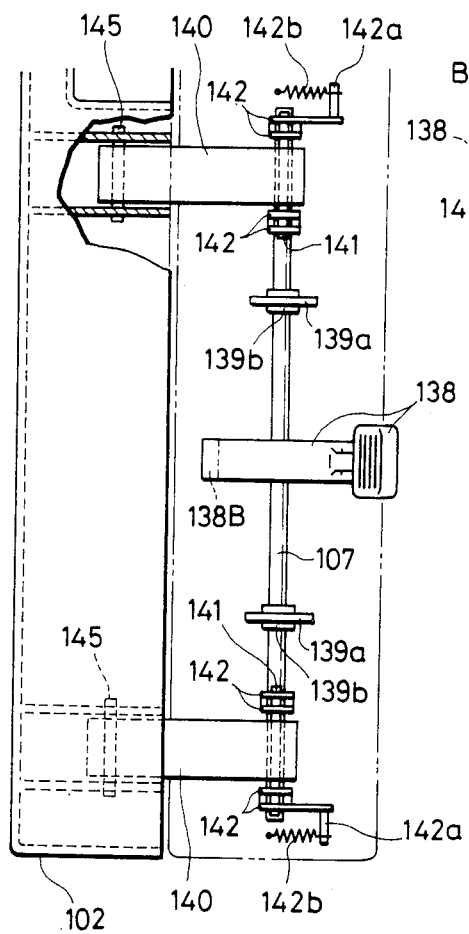
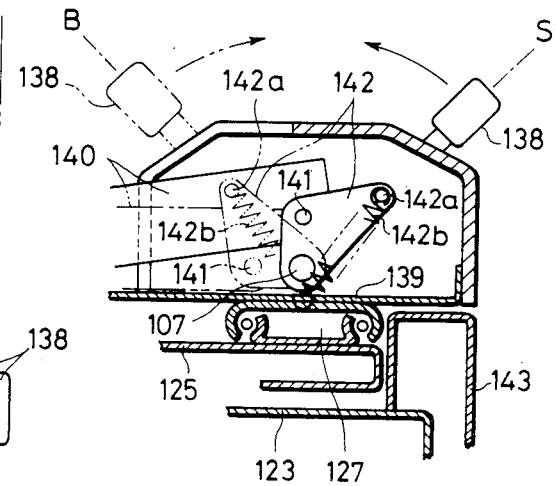

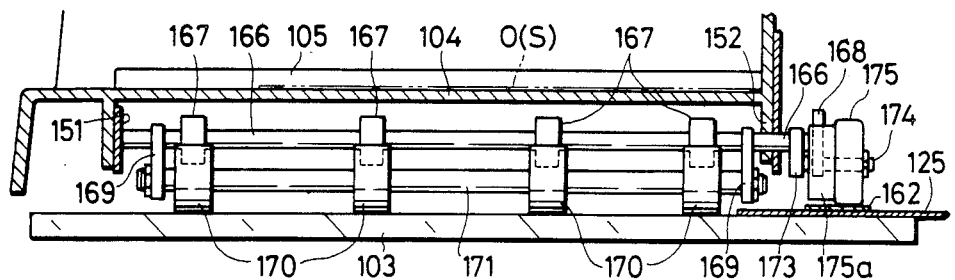
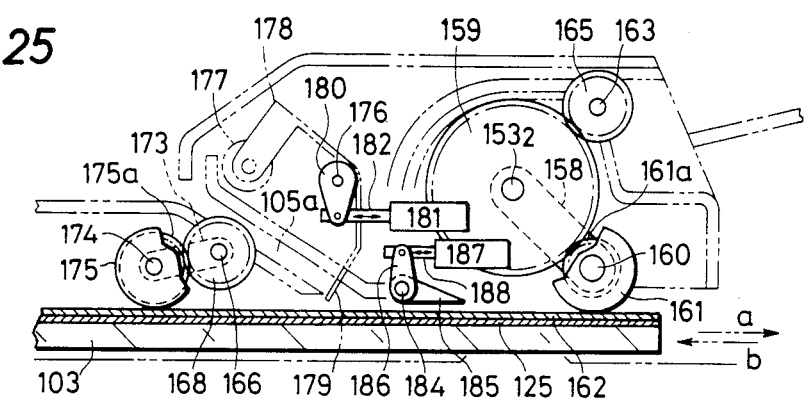
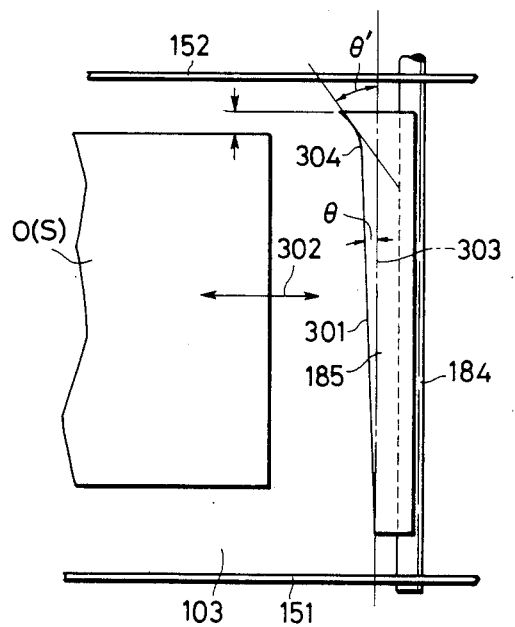
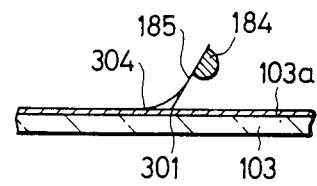

FIG. 30B

<COPY START>

CALCULATING OF FORWARD DRIVING TIME ACCORDING TO MAGNIFICATION AND SIZE OF SET CASSETTE

FIG. 30C

<GENERATION OF IMAGE LEADING EDGE SIGNAL>

SETTING OF FORWARD DRIVING TIME CALCULATED AT INITIAL COPYING (FIG. 30B), TO [FORWARD DRIVING TIMER]

IMAGE FORMING APPARATUS WITH TWO MODE ORIGINAL HANDLING SYSTEM

BACKGROUND OF THE INVENTION

1. Field of the Invention

This invention relates to an automatic original feeding device for feeding an original to an optical processing station by the use of conveying means which obtains a drive force by movement of an original carriage provided in an image forming apparatus. This invention also relates to an image forming apparatus provided with such automatic original feeding device.

2. Description of the Prior Art

Description will hereinafter be made by taking as an example an automatic original feeding device used in an electrophotographic copying apparatus.

As disclosed in U.S. Pat. Nos. 4,367,947 or 4,368,977, an automatic original feeding device for feeding an original to an exposure station by the use of a roller which obtains a rotational force by reciprocal movement of an original carriage is known. However, this known automatic original feeding device could well feed a thin sheet original to the exposure station, but could not adequately cope with a thick original such as a book original. That is, when a thick original is to be placed on a platen glass for the purpose of exposure, it has been necessary to leave the automatic original feeding device retracted from the platen glass and manually hold down the thick original. Or it has been necessary to hold down the thick original by a keep plate exclusively for use for thick originals which is provided discretely from the automatic original feeding device. This has led to a problem that the apparatus becomes bulky or the handling operation is cumbersome.

SUMMARY OF THE INVENTION

It is an object of the present invention to provide an automatic original feeding device for feeding an original to an optical processing station by the use of conveying means which obtains a drive force by movement of the original carriage.

It is another object of the present invention to provide an automatic original feeding device which can well cope with sheet originals and thick originals.

It is still another object of the present invention to provide an automatic original feeding device improved in operability.

It is yet another object of the present invention to provide an image forming apparatus provided with such automatic original feeding device.

These objects are attained, according to the present invention, by means of an image forming apparatus comprising an original carriage, a frame member having a conveying device which is capable of conveying an original in synchronism with movement of the carriage, which is reciprocally movable relative to a body of the apparatus, and a mode change-over means for causing the frame member, in a first mode, to engage the main body so as to keep the frame member stationary, and, in a second mode, causing the frame member to be movable with the carriage. In the first mode, an original is guided to an optical processing station, such as an exposure station, by moving the conveying device by movement of the carriage, and, in the second mode, by mounting the original on the carriage, covering the original with the frame member and then moving the latter together with the carriage.

BRIEF DESCRIPTION OF THE DRAWINGS

FIG. 18 is a view similar to FIG. 17 but showing the change-over to a book mode.

FIG. 19 is a view similar to FIG. 17 but showing a state in which a thick original is set.

FIG. 20 is a plan view of a mode change-over lever mechanism portion.

FIG. 21 is an enlarged side view of a toggle spring portion.

FIG. 24 is a cross-sectional view taken along line XII—XII of FIG. 22.

FIG. 25 is a rear view of a driving system.

FIG. 26 is a plan view of an original scraping sheet portion.

FIG. 27 is a cross-sectional view of the original scraping sheet portion.

FIGS. 29C, 29D, 29E, 30A, 30B and 30C are flow charts.

DETAILED DESCRIPTION OF THE PREFERRED EMBODIMENTS

The present invention will hereinafter be described in greater detail with respect to an embodiment thereof. The embodiment of the present invention which will hereinafter be described comprises an electrophotographic copying apparatus body 1 having an exposure station for exposing an original, a transparent original carriage 3 (formed of platen glass or plastic) disposed on the apparatus body 1 and reciprocally movable to convey a sheet original O to the exposure station 8 of the apparatus body 1, and a sheet original feeding device 2 disposed and stationary on the original carriage 3. The sheet original feeding device 2 contains therein means for feeding sheet originals toward the original carriage 3, means (FIGS. 7A, 7B, 8, 10A and 10B) cooperating with the original carriage 3 to reciprocally move the fed sheet original O with the original carriage 3, means (FIGS. 9A and 9B) for separating the sheet original from the original carriage 3 after completion of the exposure and discharging the sheet original, and a pressing member $2_5$ (FIG. 5B) formed of sponge or the like for pressing an original, especially, a thick original against the original carriage 3.

The present invention will hereinafter be described with respect to an embodiment applied to an electrophotographic copying apparatus usable with both sheet originals and book originals.

Figure 1A:
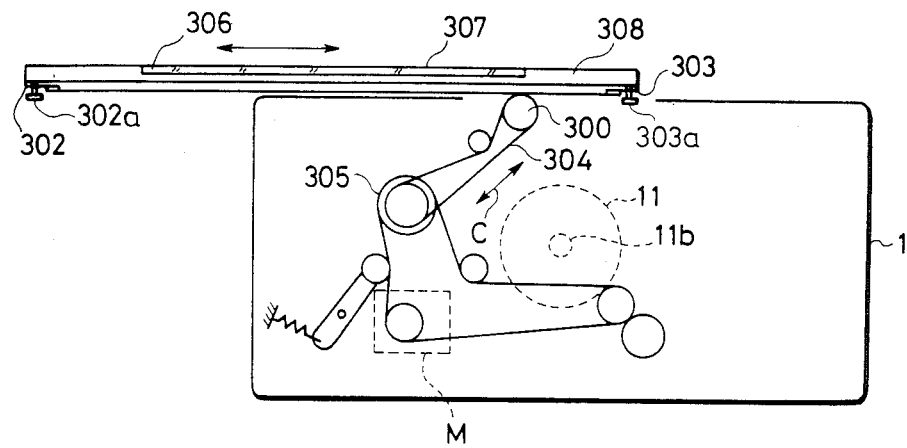
FIG. 1A is a schematic view showing a mechanism for reciprocally driving an original carriage.
Figure 1:
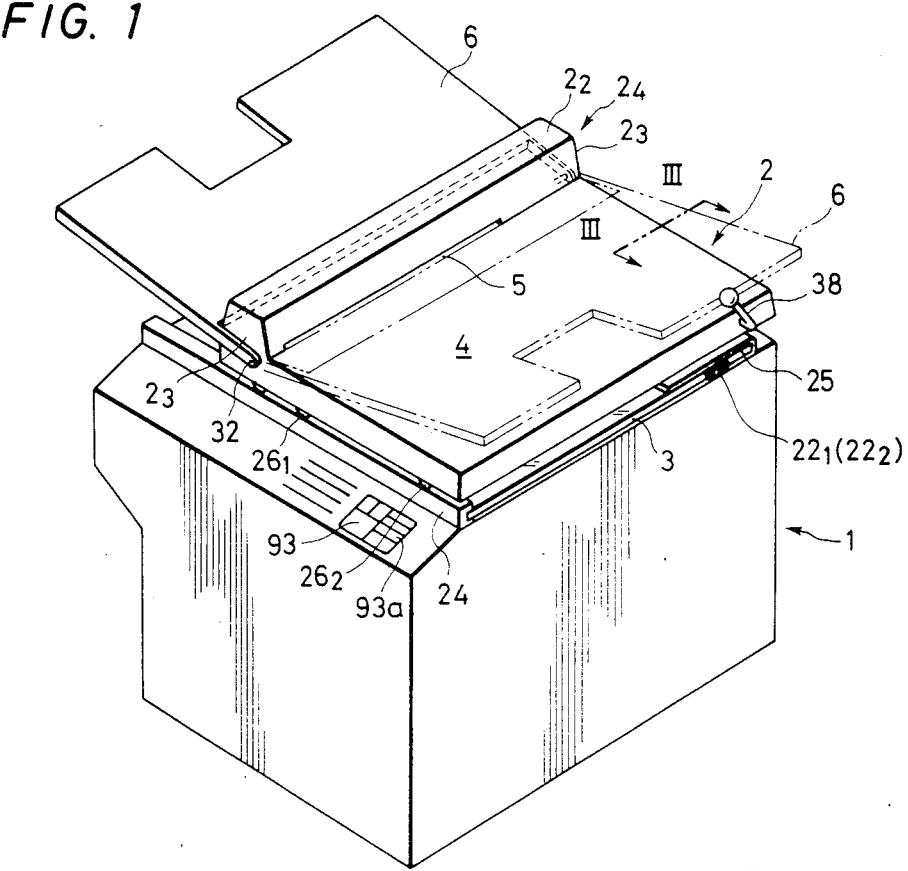
FIG. 1 is a pictorial perspective view of an electrophotographic copying apparatus provided with an automatic original feeding device to which an embodiment of the present invention is applied.
Figure 2:
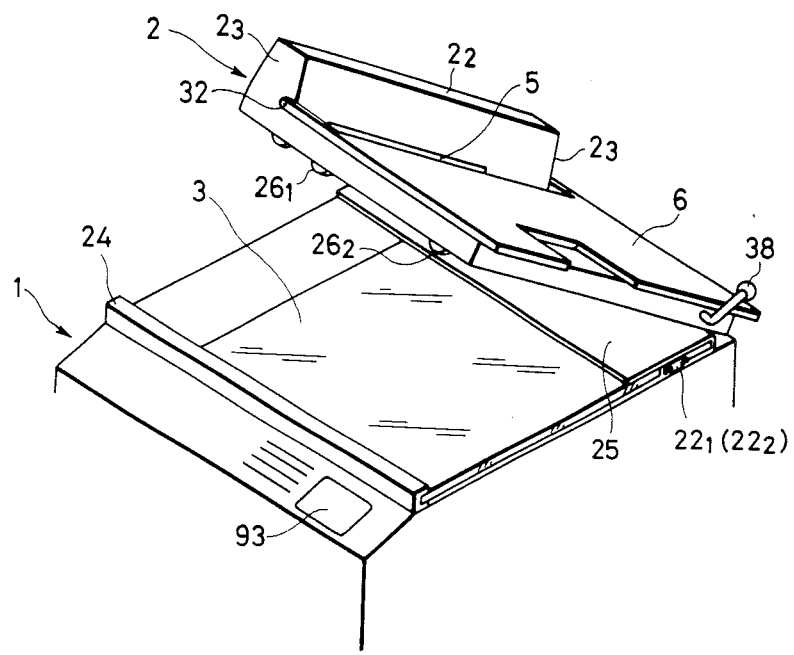
FIG. 2 is a perspective view of the automatic original feeding device as it is opened.
Figure 3:
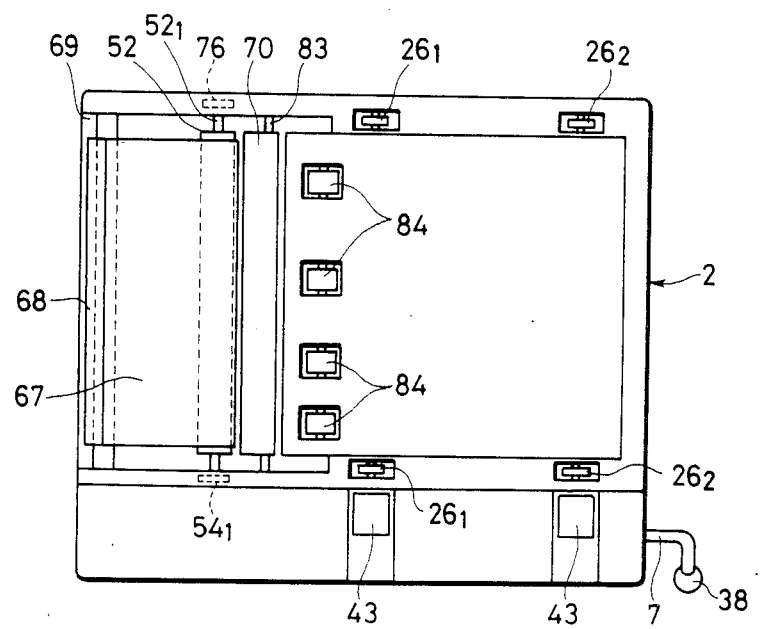
FIG. 3 is a view of the automatic original feeding device as seen from below it.

FIG. 1 is a perspective view showing the appearance of the embodiment. In FIG. 1, reference numeral 1 designates a movable original carriage type copying apparatus (hereinafter referred to as the copying apparatus), reference numeral 2 denotes an original feeding device, and reference numeral 3 designates a transparent original carriage formed of glass or plastic and reciprocally movable to the left and right relative to the copying apparatus body by rope interlocking or pinion-rack interlocking with the position of FIG. 1 as the home position. A well-known mechanism is used for reciprocally driving the original carriage, and an example thereof is shown in FIG. 1A.

FIG. 1A is a schematic view showing the mechanism for reciprocally driving the original carriage. In FIG. 1A, reference numeral 1 designates the copying apparatus body, and reference numeral 300 denotes a pulley rotatably supported on the apparatus body side. A wire 304 fixed to pins 302a, 303a provided at the opposite ends 302 and 303 of the original carriage 306 moves forwardly and backwardly in the directions of arrows C by the driving of drive means M and the operation of clutch means 305, whereby the original carriage 306 is reciprocally moved on the apparatus body 1. In the present embodiment, a construction in which a platen glass 307 is fixed and held by a frame member 308 is shown as the original carriage 306. However, any known construction of the original carriage can be suitably used.

When sheet originals are to be copied (the copying of sheet originals being hereinafter referred to as the sheet mode), the original feeding device 2 is fixed to the copying apparatus body 1 by the change-over means of FIGS. 5A–5C which will hereinafter be described. A sheet original inserted into an original feed port 5 with the upper surface of the original feeding device 2 (the upper surface of a box member $2_4$ containing said various means therein) being made as an original feed tray 4, is directed by the original carriage 3 moved forwardly to the left and is slit-exposed, and then is fed into an original discharge tray 6 during the backward movement of the original carriage.

When a book or other thick original is to be copied (the copying of such an original being hereinafter referred to as the book mode), the original feeding device 2 is fixed to the original carriage 3 by the change-over means shown in FIGS. 5A–5C. The original discharge tray 6 is turned over the original feed tray 4 as indicated by dot-and-dash lines (see FIG. 1). An original is placed onto the original carriage 3 with the original feeding device 2 being temporarily cocked about a change-over shaft as indicated by the dot-and-dash line in FIG. 5B, and then the device 2 is brought down to its original position and is reciprocally moved with the original carriage 3.

Figure 4:
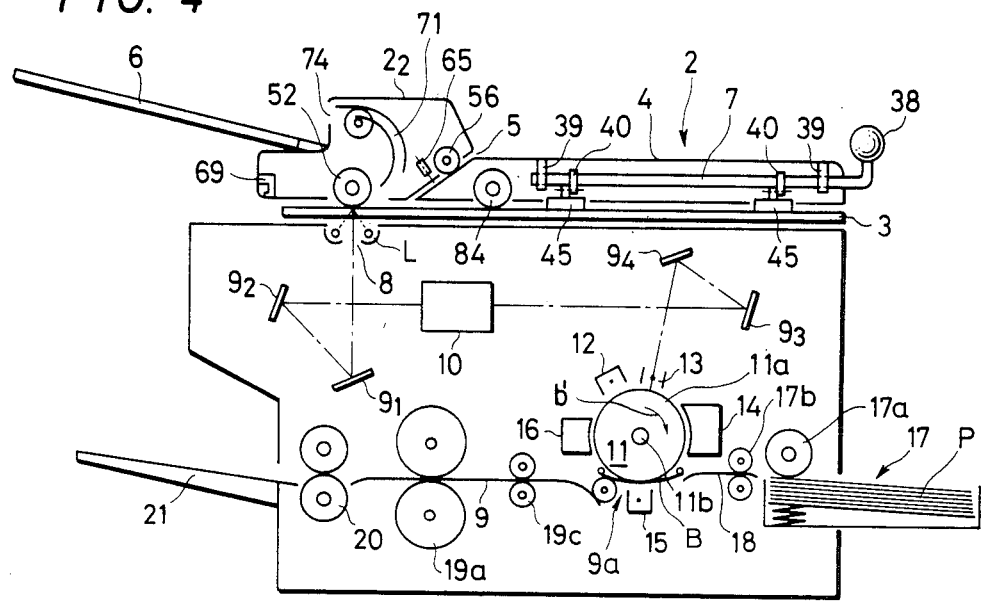
FIG. 4 is a longitudinal cross-sectional front view of an embodiment of the present invention as applied to an electrophotographic copying apparatus.

FIG. 4 is a longitudinal cross-sectional front view corresponding to FIG. 1. An original processing device is contained in the apparatus body 1. FIG. 4 shows an example of the electrophotographic copying apparatus which comprises a slit exposure station 8, reflecting mirrors $9_1$–$9_4$, an imaging lens 10, a photosensitive drum 11, chargers 12, 13, a developing station 14, a transfer station 15, a cleaning station 16, a transfer paper supply station 17, transfer paper guides 18, 19, transfer paper discharge rollers 20 and a tray 21. A fixing device 19a is disposed above the guide 19. An example of the image forming process will hereinafter be shown.

In FIG. 4, reference numeral 3 designates an original carriage formed of a transparent material such as glass or plastic and reciprocally movable on rails in the directions of arrows a (as described later). The image of an original placed on the original carriage 3 is illuminated in the slit exposure station 8 by an illuminating lamp L, and the reflected optical image thereof is slit-projected onto the photosensitive drum 11 by the reflecting mirrors $9_1$–$9_4$ and the imaging lens 10. The photosensitive drum 11 is rotated in the direction of the curved arrow $V_b$ about a shaft 11b. The charger 12 uniformly charges the surface of the photosensitive drum 11 covered with, for example, a zinc oxide photosensitive layer or an organic semiconductor photosensitive layer 11a. The drum 11 uniformly charged by the charger 12 is subjected to discharging simultaneously with image exposure by the reflecting mirrors $9_1$–$9_4$ and the imaging lens 10, whereby an electrostatic latent image is formed on the drum. This electrostatic latent image is then developed into a visible image by the developing station comprising a magnet roller (not shown) and a toner reservoir (not shown). On the other hand, one of the sheets P contained in a cassette 17 is fed onto the drum 11 by a pick-up roller 17 and a registration rollers 17b rotated in timed relationship with the image on the photosensitive drum 11. The toner image on the photosensitive drum 11 is transferred onto the sheet P by the transfer discharger 15. Thereafter, the sheet P is separated from the drum 11 by separating means 9a (such as a separating belt B shown in FIG. 4 or a separating corona discharger), and is directed to the fixing device 19a by the guide 19 and pinch rollers 19c whereby the toner image on the sheet P is fixed, whereafter the sheet P is discharged onto the tray 21 by the discharge rollers 20. After the transfer of the toner image, any residual toner on the drum 11 is removed by a cleaner 16. The image forming process is not restricted to what has been described above, but any suitable process may be employed.

Figure 5A:
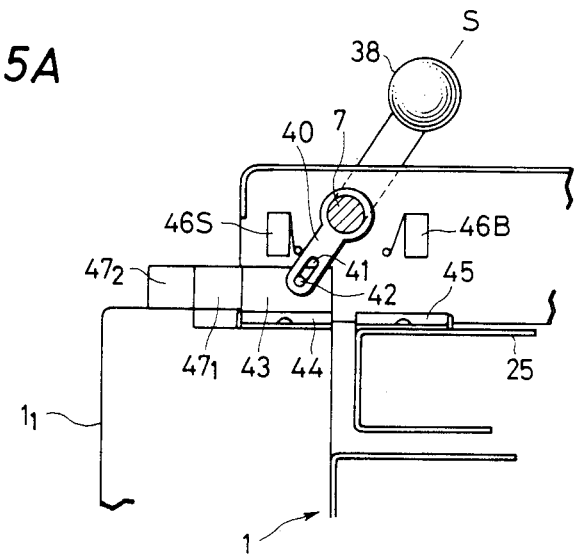
FIGS. 5A and 5B are transverse cross-sectional side view of a sheet and book process change-over mechanism taken along line III—III of FIG. 1.
Figure 5B:
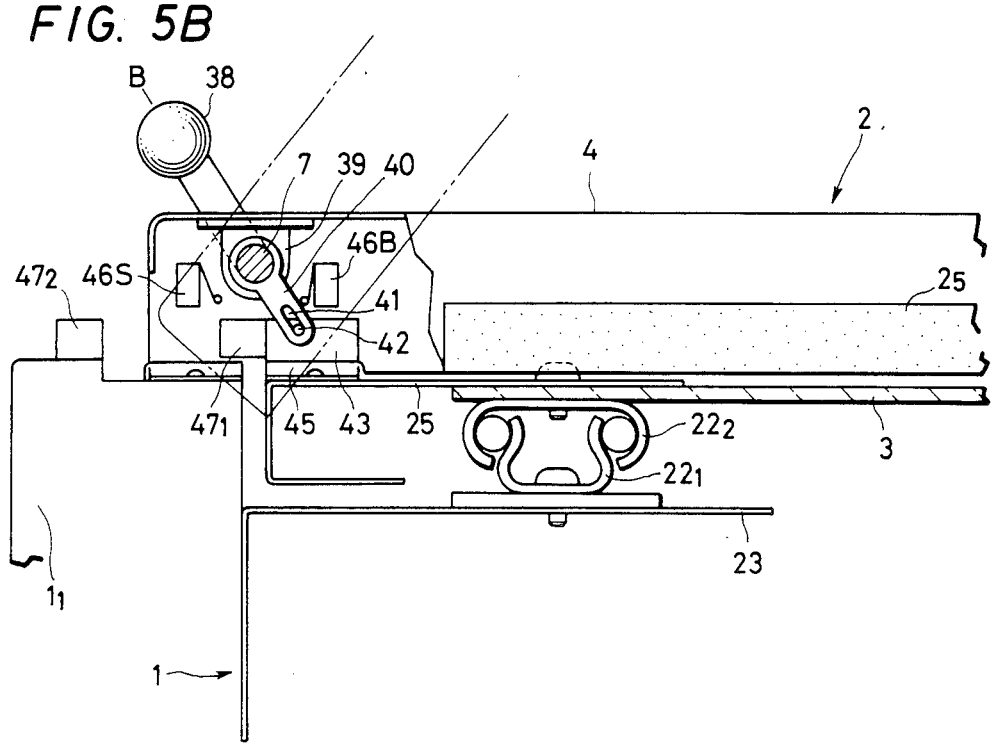

Now, FIGS. 5A and 5B are enlarged views taken along line III—III of FIG. 1. One side (that side as viewed in FIG. 1) of the original carriage 3 is supported on a receiving plate 23 in the apparatus body 1 by rails $22_1$ and $22_2$, and this side of the original carriage is guided by a guide rail 24 on the apparatus body, as shown in FIG. 1. Designated by 25 is a frame plate attached to one side of the original carriage 3 and extended sideways.

Figure 6A:
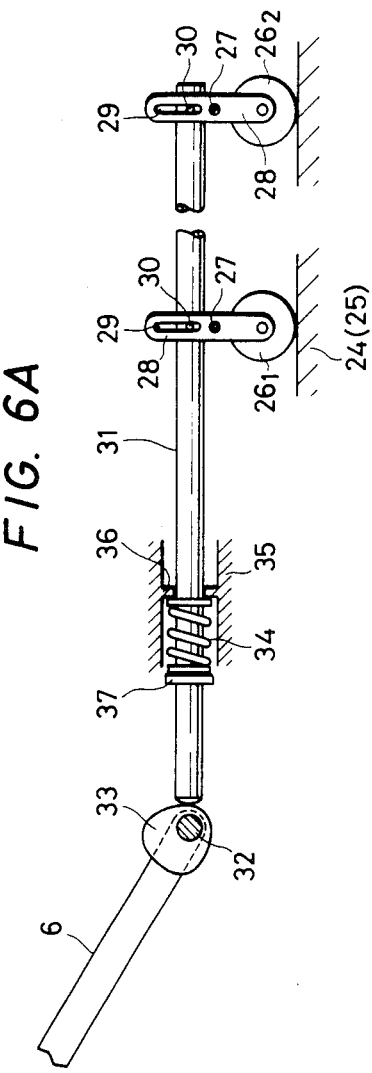
FIGS. 6A and 6B are front views of a portion of a support mechanism for the original feeding device.
Figure 6B:
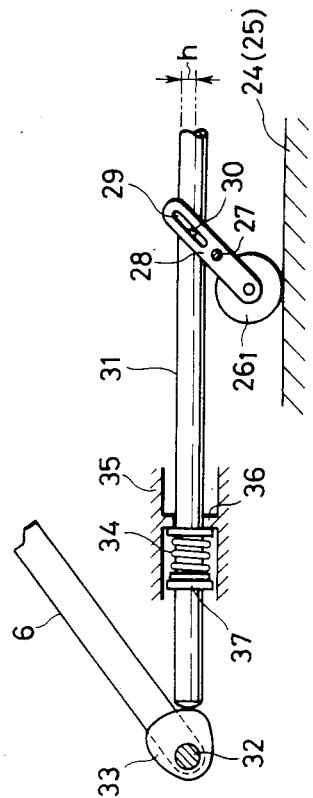

In FIGS. 1, 3, 6A and 6B, reference numerals $26_1$ and $26_2$ designate rollers for positioning the original feeding device on the original carriage 3. The pairs of left and right rollers $26_1$ and $26_2$ are disposed on this side and the opposite side, respectively, and the rollers on this side are placed on a rail 24 and the rollers on the opposite side are placed on the frame plate 25. The rollers $26_1$ and $26_2$, as shown in FIGS. 6A and 6B, are supported by support arms 28 mounted, by means of shafts 27, on the back of the original feed tray 4 comprising the upper surface of the downwardly facing box $2_4$ (FIG. 1) of the original feeding device 2. A rod 31 having pins 30 engaged in the slots 29 of the support arms 28 is extended leftwardly in parallel to the direction of reciprocal movement of the movable original carriage 3.

A cam 33 is fixed to the pivot shaft of the original discharge tray 6, and the fore end of the rod 31 is normally caused to bear against the cam 33 by a push spring 34. When the original tray 6 is open to the sheet mode position as shown in FIG. 6A, the lower surface of the cam 33 faces the rod 31 and therefore, the rod 31 is moved leftwardly to cock up the support arms 28. When, in the book mode, the tray 6 is turned over as shown in FIG. 6B, the cam 33 pushes the rod 31 rightwardly and pushes down the support arms 28. Therefore, the entire original feeding device 2 is lowered by h from the position of FIG. 6A, that is, it acts so as to urge the thick original placed on the original carriage 3. Reference numeral 35 designates a rod receiver and guide provided on the back of the original supply tray 4, and reference numerals 36 and 37 denote spring receivers.

Reference numeral 38 denotes a change-over lever (FIG. 4) provided on the aforementioned sheet mode and book mode change-over shaft 7. This shaft 7, as shown in FIGS. 5A and 5B, is mounted on the back of the original tray 4 through bearings 39 in parallel to the direction of reciprocal movement of the original carriage 3 above the boundary between the frame plate 25 of the original carriage 3 and the overhanging position $1_1$ of the body housing. A lever 40 is fixed to the change-over shaft 7, and a movable coupling member 43 operatively associated therewith by a slot 41 and a bifurcated pin 42 is provided.

Figure 5C:
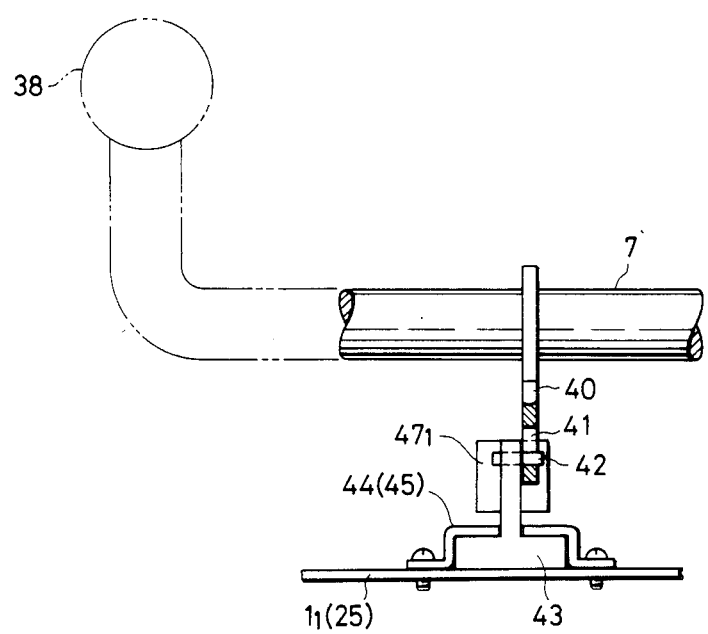
FIG. 5C is a front view of a portion of such mechanism.

When the change-over lever 38 is set to the sheet mode S position of FIG. 5A, the block-like movable coupling member 43 fits to a fixed coupling portion 44 provided on the upper surface of the overhanging portion $1_1$, beyond the boundary between the original carriage frame 25 and the body's hanging portion $1_1$, as shown in FIG. 5C, and couples the original feeding device 2 to the copying apparatus body 1, that is, during the sheet mode, the original feeding device 2 is stopped and only the original carriage 3 is reciprocally moved. When the change-over lever 38 is set to the book mode position B as shown in FIG. 5B, the movable coupling member 43 fits into a fixed coupling member 45 (of the same shape as the portion 44) on the upper surface of the original carriage frame plate 25, and the original feeding device 2 reciprocally moves with the original carriage 3.

In FIGS. 5A and 5B, reference character 46S designates a switch for signalling that the mode has been changed over to the sheet mode and reference character 46B denotes a switch for signalling that the mode has been changed over to the book mode. These switches are mounted in the original feeding device 2 and respond to the aforementioned lever 40. Reference numeral $47_1$ denotes an electrical connector mounted on the movable coupling member 43 and, in the case of the sheet mode, as shown in FIG. 5A, it is coupled to a connector $47_2$ fixed on the body 1 side and electrically connects the copying apparatus body 1 to the original feeding device 2.

Figure 7A:
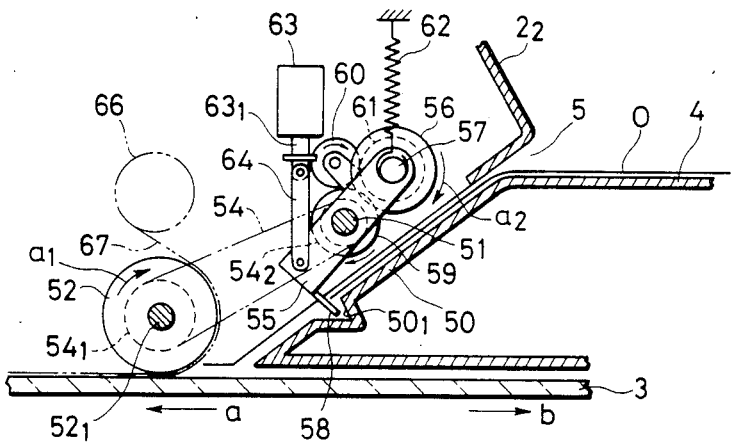
FIGS. 7A and 7B are a longitudinal cross-sectional front view and a plan view, respectively, of a sheet original feeding mechanism.
Figure 7B:
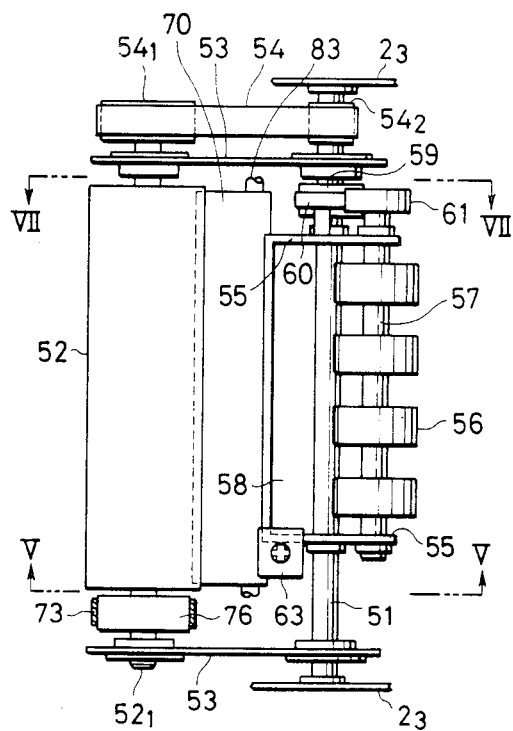

FIGS. 7A and 7B show a sheet original feeding mechanism incorporated in a mechanism chamber $2_2$ upwardly projectedly provided integrally with the sheet original tray 4 at the fore portion of the original feeding device 2. Reference numeral 50 designates a sheet original guiding ramp connected to the original tray 4 and formed in the direction of extension of the original feed port 5, reference numeral $50_1$ denotes a recess or a groove formed in a portion of the ramp 50, reference numeral 51 designates an intermediate shaft provided horizontally between the front and back side walls $2_3$ of the mechanism chamber $2_2$ and perpendicularly to the direction of reciprocal movement of the original carriage 3, reference numeral 53 denotes a pair of fore and rear pivotable arms loosely supported on the intermediate shaft 51, and reference numeral 52 designates an original conveying roller supported on the pivotable arms 53. The original conveying roller 52 normally bears against the upper surface of the original carriage 3 from gravity and during the sheet mode, as previously described, the original feeding device 2 is fixedly coupled to the body 1 and therefore, the roller 52 rotates while sliding relative to the original carriage 3. The rotation of the roller 52 is transmitted to the intermediate shaft 51 by a belt 54 or other suitable transmission mechanism.

Reference numeral 55 designates a pair of fore and rear pivotable plates loosely supported on the intermediate shaft 51 as shown in FIG. 7B, reference numeral 56 denotes original feeding rollers supported on a shaft 57 between the upper portions of the pivotable plates 55, reference numeral 58 designates a shutter for aligning the fore end of the original provided between the lower portions of the pivotable plates 55, reference numerals 59, 60 and 61 denote gears for transmitting movement from the intermediate shaft 51 to the feeding roller shaft 57, reference numeral 62 designates a spring for causing the shutter 58 to be dropped into the recess $50_1$ of the afore-mentioned ramp guide 50, and reference numeral 63 denotes a plunger for raising the lower side of the pivotable plate 55 against the force of the spring 62.

Sheet Original Processing (Sheet Mode)

When an original O is fed along the tray 4, the original feed port 5 and the ramp guide 50, the leading end edge thereof strikes against the shutter 58 and the leading end position is controlled, whereby the bending of the original is modified. When a suitable sensor such as that shown in FIG. 4, for example, a photoelectric sensor 65, detects this feeding, the plunger 63 is energized to pivot the pivotable plate 55 clockwise as viewed in FIG. 7A. Thereby the shutter 58 is permitted to escape and the feeding roller 56 is urged against the original on the ramp guide 50.

Figure 8:
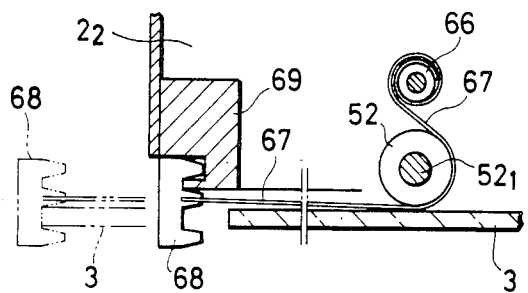
FIG. 8 is a longitudinal cross-sectional front view of a sheet original keeping mechanism.

When the original carriage 3 is moved forwardly in the leftward direction a, the conveying roller 52 rotates in a direction $a_1$ at that position, and the feeding roller 56 is rotated in a direction $a_2$ by the transmission system 54, 59–61 and feeds the original into between the conveying roller 52 and the original carriage 3. An original keeping sheet 67 drawn out of a drum 66 containing an automatic take-up mechanism therein is wound on the conveying roller 52 and extends forwardly in the direction of forward movement of the original carriage 3 as shown in FIG. 8, and the fore end of the sheet 67 is secured to a hook 68.

When the original carriage 3 is in the home position of FIG. 4, the hook 68 is engaged with a stopper 69 provided at the fore end portion of the mechanism chamber $2_2$, but when the original carriage 3 begins to move forwardly, the hook 68 is soon pushed by the fore end of the original carriage and therefore, the original keeping sheet 67 also moves forwardly at a speed equal to that of the original carriage 3. Accordingly, the original O fed in the manner described above is held between the original carriage 3 and the keeping sheet 67 and moves forwardly with the original carriage without the possibility of positional deviation and is subjected to the slit exposure scanning in the original processing station disposed just beneath the conveying roller 52.

Figure 9A:
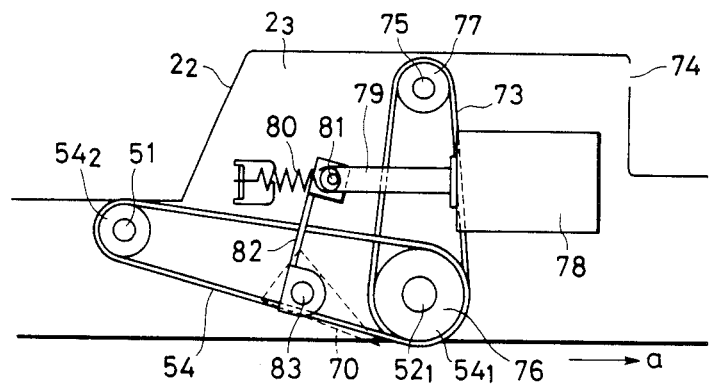
FIGS. 9A and 9B are longitudinal cross-sectional front views of a sheet original discharging mechanism.
Figure 9B:
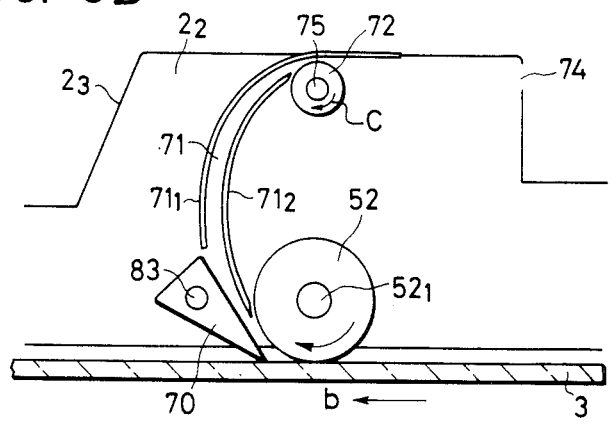

The original carriage 3 is moved forwardly to a predetermined position, and then is moved backwardly. At that time, the original keeping sheet 67 is also rewound on the drum 66 at the same speed as the speed of backward movement of the platen glass 1 (a well-known rewinding mechanism can be used) and therefore, the original O held between the original carriage 3 and the original keeping sheet 67 is also moved backwardly. When the trailing end edge of the original becomes separated from the conveying roller 52, the trailing end edge of the original O is stripped off from the original carriage 3 because the fore end of an original separating pawl plate 70 shown in FIGS. 9A and 9B bears against the upper surface of the original carriage 3, and the original comes into a paper discharge path 71 comprising opposed guides $71_1$ and $71_2$. The original O is moved up with the backward movement of the original carriage 3 and is discharged into the tray 6 through a discharge port 74 because a paper discharge roller 72 is provided in the upper portion of the paper discharge path 71 and is being rotated in the direction of arrow c while being operatively associated with the shaft $52_1$ of the conveying roller 52 by a belt 73 as shown in FIG. 9A.

A one-way clutch (not shown) is provided between one of the conveying roller shaft $52_1$ and the paper discharge roller shaft 75 and one of pulleys 76 and 77 so as to transmit only the rotation of the conveying roller shaft $52_1$ during the backward movement of the original carriage 3 to the roller 72. The belt transmission mechanism may be changed to an other gear mechanism or the like.

When two or more copies are to be obtained for an original, the separating pawl plate 70 is not caused to bear against the original carriage 3 during the backward stroke of the original. When, for this purpose, the power supply to a separating pawl plunger 78 is cut off, the rod 79 thereof is pulled back by a spring 80. A lever 82 operatively associated with a shaft 81 by the rod 79 pivots the fulcrum shaft 83 counter-clockwise as viewed in FIG. 9A, and pivots the separating pawl plate 70 secured to the shaft 83, as shown in FIG. 9A. Thereupon, the original is moved backwardly with the original carriage 3 and in the meantime, it is urged against the surface of the original carriage by an original keeping roller 84 (FIG. 4) provided in the original feeding device 2 and therefore is not displaced on the surface of the original carriage.

A cycle is repeated in which the original carriage returns to the start position of FIG. 4 and again is moved forwardly and is moved backwardly via the exposure scanning stroke (at that time, of course, the leading end portion of the original lies under the conveying roller 52). The separating pawl plunger 78 is energized by the final copy number signal from a copy number counter and causes the separating pawl plate 70 to bear against the original carriage 3.

Figure 11:
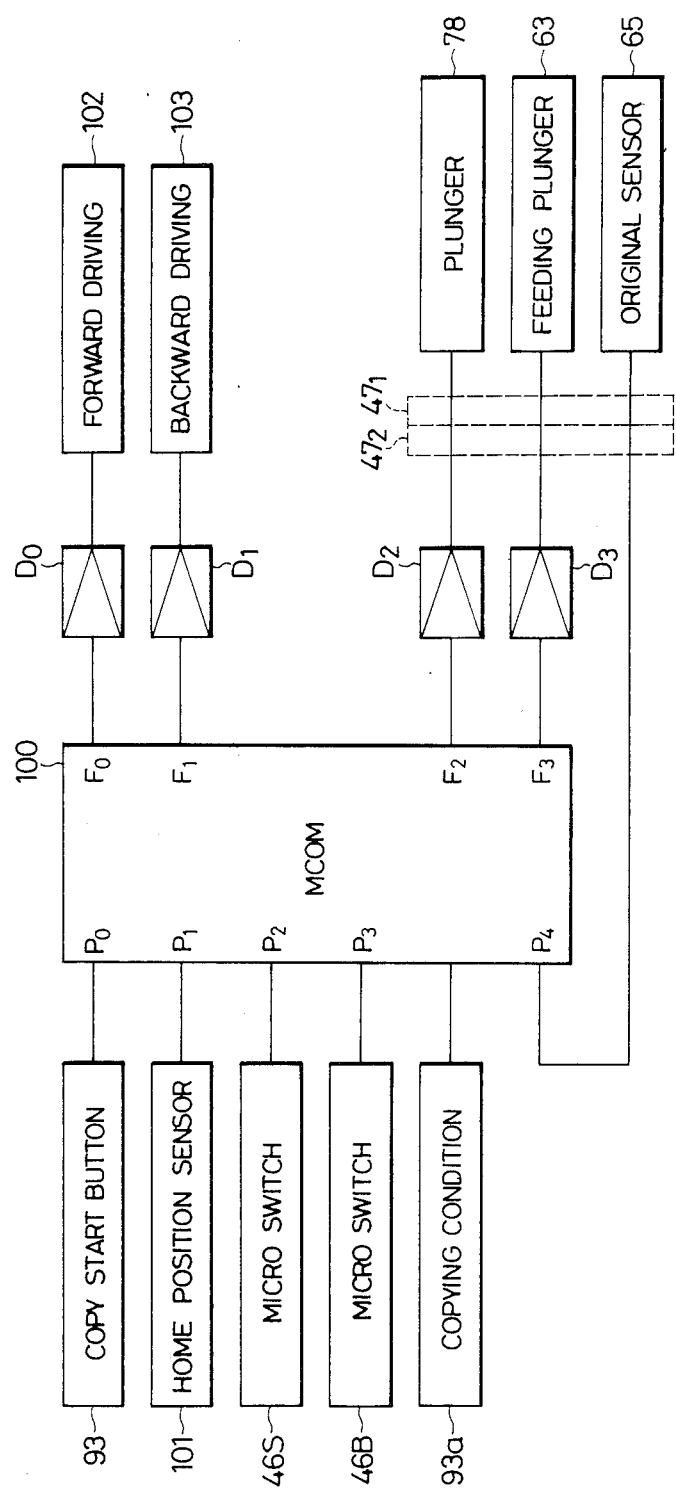
FIG. 11 is a block diagram of the operation control circuit of the device according to an embodiment of the present invention.

FIG. 11 is a block diagram showing a control circuit for effecting the above-described operation. This control circuit comprises chiefly a well-known one-chip microcomputer (hereinafter referred to as MCOM) 100 containing ROM, RAM, etc. therein. The signal from the original sensor 65 in the original feeding device 2 or a signal representative of the copying condition (operating panel 93a) such as the number of copies, the copying magnification or the image density is input to the input ports $P_0$–$P_4$ of MCOM through the aforementioned copy start button 93, a home position sensor 101 for detecting whether the original carriage 3 of the copying apparatus is in a predetermined position, the sheet and thick original change-over microswitches 46S, 46B and connectors $47_1$, $47_2$.

From output ports $F_0$–$F_3$, output signals for ON-OFF-operating forward driving means 102 and backward driving means 103 for driving the original carriage 3 which is a load and output signals for ON-OFF-operating the separating pawl plunger 78 and the original feeding plunger 63 in the original feeding device through the connectors $47_1$ and $47_2$ are put out through drivers $D_0$–$D_3$.

The reading-in of these input signals or the ON-OFF of the load is controlled in accordance with a program stored in the ROM in MCOM 100.

Figure 12A:
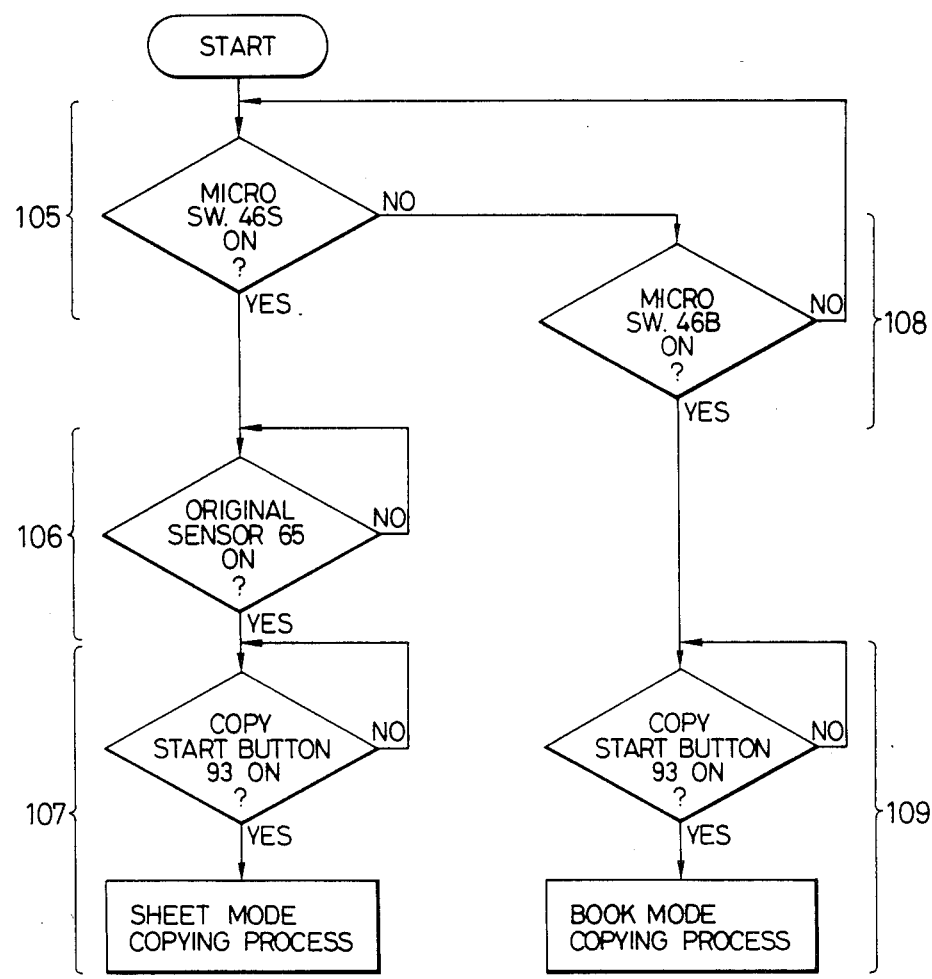
FIGS. 12A and 12B are flow charts thereof.
Figure 12B:
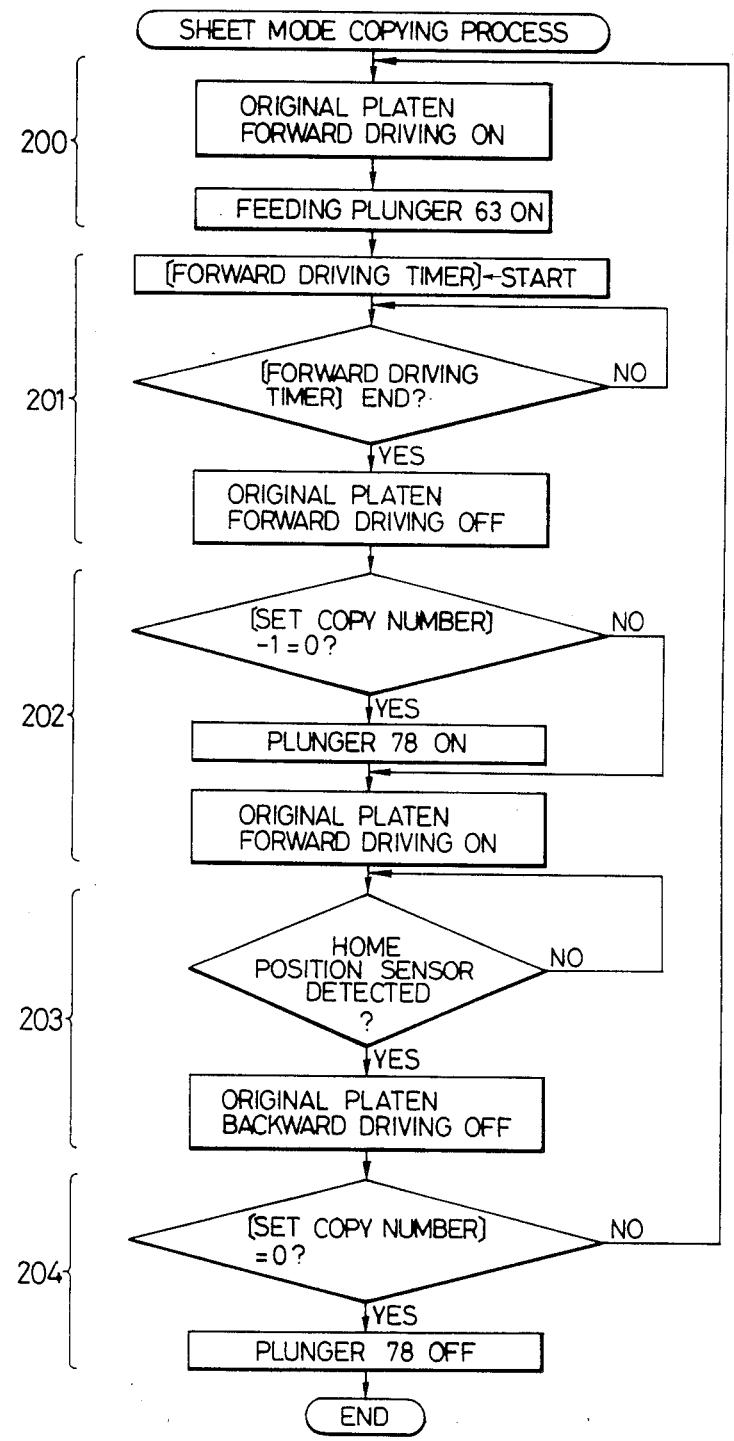

Upon setting of the change-over lever 38 to the sheet mode S, the switch 46S is closed (the step 105 of FIG. 12A) and at the same time, the connectors $47_1$ and $47_2$ are connected. When the original is inserted along the tray 4 until the leading end edge thereof strikes against the shutter 58 from the original feed port 5, the optical sensor 65 detects the presence of paper (step 106). Thereafter, when the start button 93 is depressed, the sheet mode copying operation is started (step 107), whereby the forward driving means of the original carriage 3 becomes ON and the feeding plunger 63 becomes ON (the shutter 58 becomes open) (the step 200 of FIG. 12B).

At step 201, the forward driving timer is started and the platen glass forward driving means becomes OFF.

If at step 202, (the number of set copies) $-1 \neq 0$, the pawl plunger 78 of FIG. 9A becomes ON and the platen glass backward driving means becomes ON.

At step 203, the home position is detected and the backward driving means becomes OFF.

If at step 204, (the number of set copies) $-1 = 0$, the separating pawl plunger 78 becomes OFF and the copying operation is terminated (END).

During production of plural copies, at step 202, the pawl plunger 78 becomes inoperative and when, at step 204, the number of copies ≠0, the program returns to step 200 and the operation is repeated until the number of copies becomes 0.

Figure 10A:
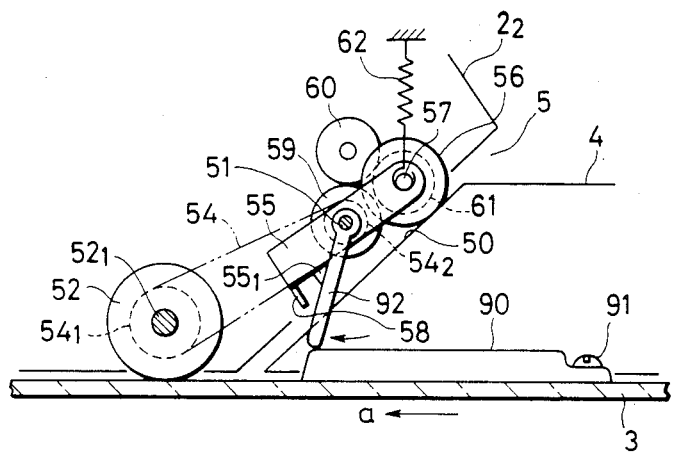
FIGS. 10A and 10B are longitudinal cross-sectional front views of another embodiment of the sheet original feeding mechanism.
Figure 10B:
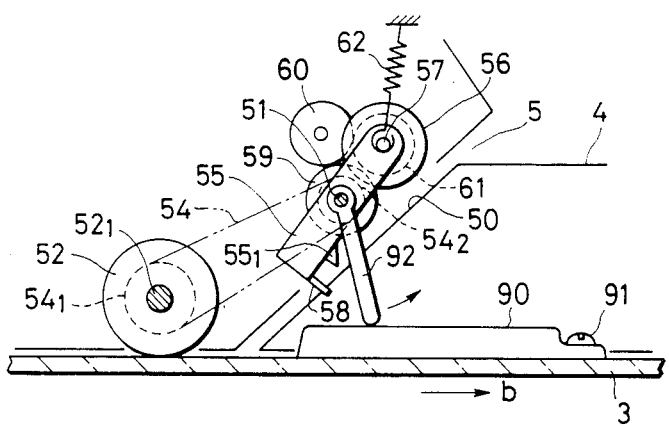

FIGS. 10A and 10B show another embodiment of the sheet original feeding device. In this embodiment, the feeding plunger 63 of FIG. 7A is eliminated and the shutter 58 and the feeding roller 56 are mechanically operated.

Reference numeral 90 designates a plate cam secured to the original carriage 3 by a screw 91, and this plate cam is adjustable relative to the original carriage 3 in the direction of movement a or b thereof. Reference numeral 92 denotes an original feed lever pivotably provided on the original feed intermediate shaft 51. The tip end of the original feed lever 92 is engaged with the surface of the plate cam 90 when the original carriage 3 is moved.

When the original O is inserted into the original feed port 5 and the copy button 93 (FIG. 1) is depressed, the original carriage 3 starts to move in the direction of arrow a. Thereupon, the lower end of the original feed lever 92 rides onto the plate cam 90 and becomes frictionally engaged therewith and is thereby pivoted clockwise as viewed in FIG. 10A, and pivots the pivotable plate 55 clockwise through a projection $55_1$ secured to the pivotable plate 55. Accordingly, the feeding roller 56 is urged against the original as shown in FIG. 10A and the shutter 58 opens the paper supply path, and the original is fed onto the original carriage. Since the original may be fed in until it is held by the original conveying roller 52, the length of the plate cam 90 may be greater than the distance from the shutter 58 to the conveying roller 52.

When the copying operation is terminated and the direction of movement of the original carriage 3 changes from the direction a to the direction b as shown in FIG. 10B, the original feed lever 92 is pivoted counter-clockwise by the frictional engagement thereof with the plate cam 90. However, the original feed lever 92 rotates idly relative to the shaft 51 and therefore, the pivotable plate 55 is pulled by the spring 62 and is rotated counter-clockwise. Thereby the shutter 58 is closed, and the feeding roller 56 comes to a standstill at a raised position spaced apart from the sheet original guide ramp.

To adjust the timing at which the shutter 58 is opened, the point of time at which the original feed lever 92 starts to pivot, that is, the position of the plate cam 90 on the original carriage 3, may be adjusted by the screw 91. Also, a one-way clutch is provided between the feeding roller 56 and the shaft 57 thereof so as to prevent the feeding roller 56 from rotating during the backward movement of the original carriage 3 in the direction b.

Thick Original Processing (Book Mode)

The change-over lever 38 is changed over to the book mode position of FIG. 5B. Thus, the engaging member 43 comes into engagement with the engaging member 45 of the original carriage 3 and the original feeding device also moves with the original carriage 3. By this change-over of the lever 38, the microswitch 46B for book mode is closed (the step 108 of FIG. 12A) and the connector $47_1$ becomes disconnected from the fixed connector $47_2$. When the original discharge tray 6 in the solid-line position of FIG. 1 is turned over the tray 4 about the shaft 32 of FIG. 6A as indicated by the dot-and-dash lines, the cam 33 on the shaft is also rotated therewith. Thus, the rod 31 is pushed by the cam 33 and is moved back against the force of the return spring 34, and the original feeding device 2 lowers by the height h as previously described with respect to FIGS. 6A and 6B.

When a copy of a thick original such as a book is to be obtained, the original feeding device 2 is cocked up about the change-over shaft 7 as indicated by dots-and-dash lines in FIG. 5B. Thereafter, a thick original is placed onto the original carriage 3 and the device 2 is brought down to its original position, whereupon the original feeding device 2 provides an original keeping member from its gravity. At that time, the original is smoothly pressed against the original carriage 3 by the resilient force of the pressing member $2_5$.

The operation of copying the book original is effected by integral movement of the original carriage 3 and the original feeding device 2 in the order of the steps 108, 109 and 204.

In the above-described embodiment, all of the sheet original feeding means, the means cooperating with the original carriage to reciprocally move the sheet original and the means for separating and discharging the original are incorporated in the original feeding device 2 and therefore, check-up and maintenance of those means can be accomplished easily by cocking up or removing the feeding device 2. Also, since those means are interlocked with one another in the feeding device, the mutual adjustment of those means can be accomplished easily and accurately.

As described above, the present embodiment is characterized in that in the case of a copying apparatus for sheets and books, the sheet and book change-over means can be easily constructed.

Another embodiment of the present invention will now be described by reference to FIGS. 13 to 29. This embodiment comprises a body apparatus 101 for reading an original, a platen glass or original carriage 103 reciprocally movable to convey the original to the reading position 108 of the body apparatus, and an original feeding device 102 for feeding a sheet original O (S) (FIG. 14) toward the original carriage 103. The present embodiment is provided with change-over means 138, 143 and 144 for sheet original processing and book original processing, and in the case of a sheet original, the sheet original feeding device 102 is restrained by the body apparatus 101 and stopped thereby, and the sheet original O (S) is fed from the sheet original feeding device 102 toward the reciprocally moving original carriage 103.

In the case of a book original, the sheet original feeding device 102 is changed over so as to be reciprocally moved with the original carriage 103 and the book original O (B) (FIG. 19) placed on the original carriage 103 may be conveyed while being held down by the sheet original feeding device 102. The original carriage 103 on which the original is placed has on its surface a layer of such a transparent material that the coefficient of friction between the original and the original carriage 103 is greater than the coefficient of friction between the original and auxiliary means for urging the original against the original carriage 103.

Thus, with the above-described construction, an original conveying device for both of the sheet mode and the book mode can be constructed simply and compactly. The mechanical change-over between the sheet original conveyance and the book original conveyance is accomplished simply by operating a mode change-over lever 138, and reversible change-over between the book mode and the sheet mode can be accomplished immediately and the operation therefor is simple, and such construction can be obtained at a low cost.

Also, a layer of a transparent material having a great coefficient of friction with respect to the original is provided on the surface of the original carriage so that the coefficient of friction between the original and the original carriage is greater than the coefficient of friction between the original and the auxiliary means for urging the original against the original carriage. Thus, even if the apparatus vibrates and the original keeping means vibrates relative to the original carriage, no deviation of the original will occur because the original is not in intimate contact with the original carriage due to the friction force between the original and the layer of said material. The formation of the layer of said material can be accomplished by attaching to the upper surface of the original carriage a transparent sheet-like layer of a high coefficient of friction as thin as not to affect the image or by coating the upper surface of the original carriage with such a material.

This embodiment is applicable to various original reading apparatuses, and particularly suitable for use in an electrophotographic copying apparatus to make it compact.

Figure 13:
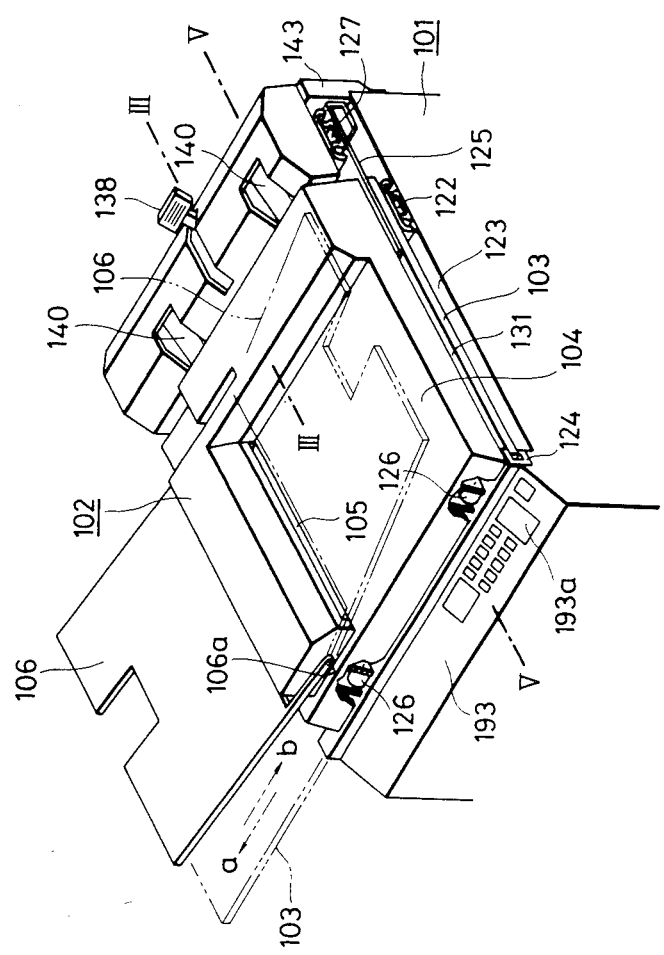
FIG. 13 is a pictorial perspective view.
Figure 14:
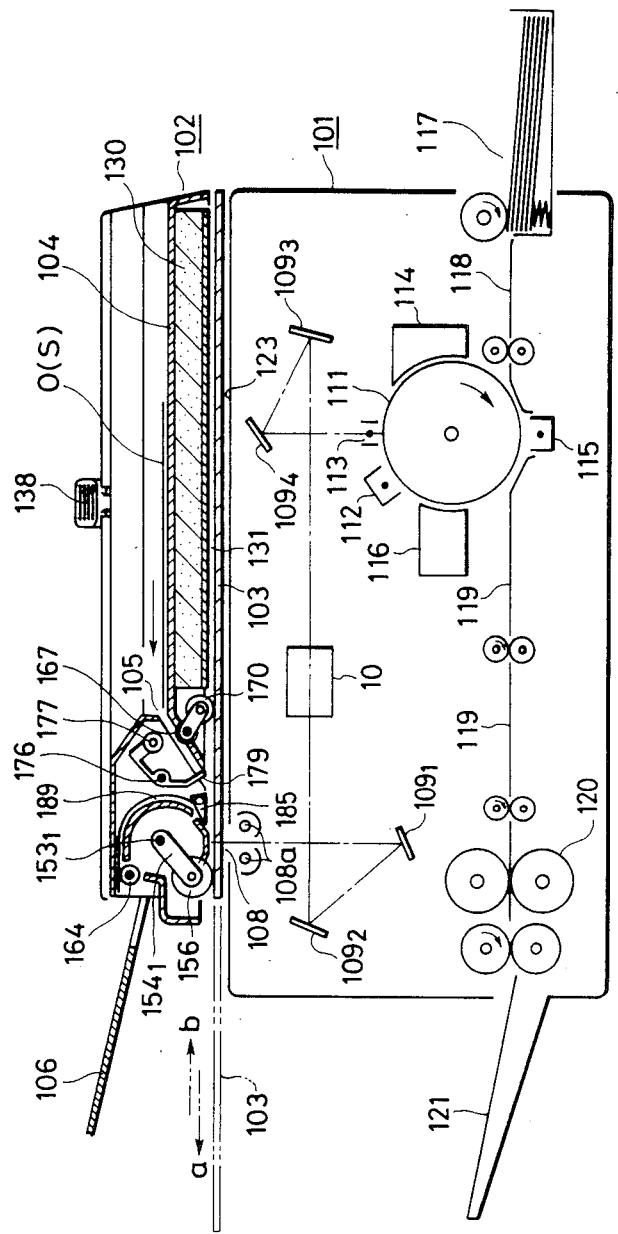
FIG. 14 is a longitudinal cross-sectional front view including the copying apparatus body.
Figure 16:
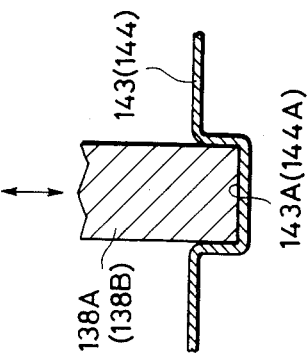
FIG. 16 is a cross-sectional view of an engaging projection and an engaging recess portion.

FIG. 13 is a pictorial perspective view, and FIG. 14 is a longitudinal cross-sectional front view. In these Figures, reference numeral 101 designates a movable original carriage type copying apparatus (hereinafter simply referred to as the copying apparatus), reference numeral 102 denotes an original feeding device, and reference numeral 103 designates a transparent original carriage adapted to be driven forwardly relative to the copying apparatus body in the direction of dots-and-dash line a by rope interlocking or pinion-rack interlocking with the solid-line position of FIGS. 13 and 14 as the home position and to be driven backwardly in the direction of dots-and-dash line b to the home position when it arrives at the terminal of the forward movement. A well-known mechanism for reciprocally driving the original carriage can be suitably used.

When a sheet original is to be copied (hereinafter referred to as the sheet mode), the original feeding device 102 is fixed to the copying apparatus body 101 by change-over means 138 and 143 which will later be described. A sheet original O (S) (FIG. 14) inserted into an original feed port 105 with the upper surface of the original feeding device 102 as a tray 104 is directed by the original carriage 103 moved leftwardly and is slit-exposed, and then is fed out onto an original tray 106 during the backward movement of the original carriage 103.

When a book or other thick original is to be copied (hereinafter referred to as the book mode), the original feeding device 102 is fixed to the original carriage 103 by change-over means 138 and 144. The original discharge tray 106 is pivoted about a hinge portion 106a as indicated by dots-and-dash lines in FIG. 13 and turned over the original feed tray 104. An original is placed onto the original carriage 103 with the original feeding device 102 being temporally cocked up from the original carriage 103 about a shaft 145 as indicated by dots-and-dash lines in FIG. 18, and the device 2 is brought down as an original keeping member onto the original O (B) (FIG. 19), and then the original feeding device 102 is reciprocally moved with the original carriage 3. Thus, according to the present embodiment, the original feeding device 102 can well cope with not only sheet originals but also thick originals.

An original processing mechanism is contained in the copying apparatus body 101, as shown in FIG. 14. The present embodiment is an example of the electrophotographic copying mechanism and, like the previously described embodiment, it comprises a slit exposure station 108, original illuminating lamps 108a, 108a, reflecting mirrors $109_1$–$109_4$, an imaging lens 110, a photosensitive drum 111, chargers 112, 113, a developing station 114, a transfer station 115, a cleaning station 116, a transfer paper supply station 117, transfer paper guides 118, 119, a fixing device 120 and a tray 121.

Figure 15:
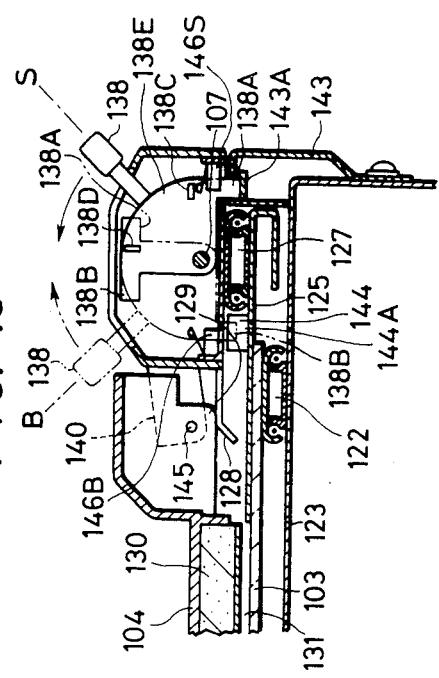
FIG. 15 is a cross-sectional view taken along line III—III of FIG. 13.
Figure 17:
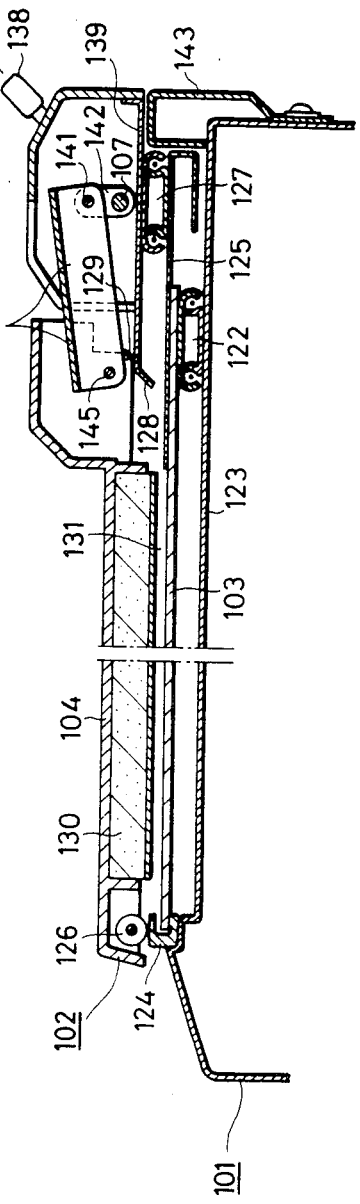
FIG. 17 is a cross-sectional view taken along line V—V of FIG. 13.

FIGS. 15 and 17 are transverse cross-sectional side views taken along line III—III and line V—V, respectively, of FIG. 13. One side (the opposite side as viewed in FIG. 13) of the original carriage 103 is supported by a receiving plate 123 in the body 101 through a rail 122 disposed in the direction of reciprocal movement of the original carriage 103. Also, the edge portion of the original carriage 103 on this side thereof is fitted in and supported by a guide rail 124 disposed in the body 101 in the direction of reciprocal movement of the original carriage 103, as shown in FIGS. 13, 17 and 19, and is guided along the rail 124. Designated by 125 is a frame plate attached to one side of the original carriage 103 and extended sideways. A rail 127 is also fixed to the frame plate 125, and the bottom plate 139 of the original feeding device 102 is fixed to and supported by this rail 127.

The original carriage 103 is slidable along the rails 122 and 124 in the forward direction a and the backward direction b, but is immovable in a direction perpendicular to the directions a and b. The original feeding device 102 is also slidable along the rail 127 in the directions a and b, but is immovable in a direction perpendicular to the directions a and b. That is, the original carriage 103 and the original feeding device 102 are independently slidable relative to the copying apparatus body 101 in the directions a and b, but are immovable in a direction perpendicular to the directions a and b.

Reference numeral 126 (FIGS. 13, 17, 18 and 19) designates a pair of left and right positioning rollers provided on this side of the original feeding device 102. Reference numeral 128 denotes a pair of left and right cams, sometimes referred to hereafter as projections, extending from a bottom plate 139. Reference numeral 129 designates a pair of left and right guides formed in a portion of the original feeding device 102 at positions opposed to the cams 128.

Reference numeral 107 denotes a sheet mode and book mode change-over shaft. This shaft 107 is rotatably supported on a pair of left and right cut-up portions 139a and 139a (FIG. 20) cut up from the bottom plate 139 of the original feeding device 102 mounted and supported on the rail 127, with the axis of the shaft 107 being parallel to the direction of reciprocal movement of the original carriage 103. Reference characters 139b designates bearings mounted on the cut-up portions 139a and 139a.

Reference numeral 138 denotes a mode change-over lever secured substantially to the central portion of the mode change-over shaft 107. The shaft 107 may be rotatively operated clockwise or counter-clockwise by this lever 138. Two opening-closing pivotable plates 142 (FIG. 20) are secured to each of the opposite ends of the shaft 107. Each one end of links 140 is connected to each two of the left and right opening-closing pivotable plates 142 through a shaft 141. Also, each of the other ends of the left and right links 140 is connected to the original feeding device 102 through a shaft 145.

Figure 28:
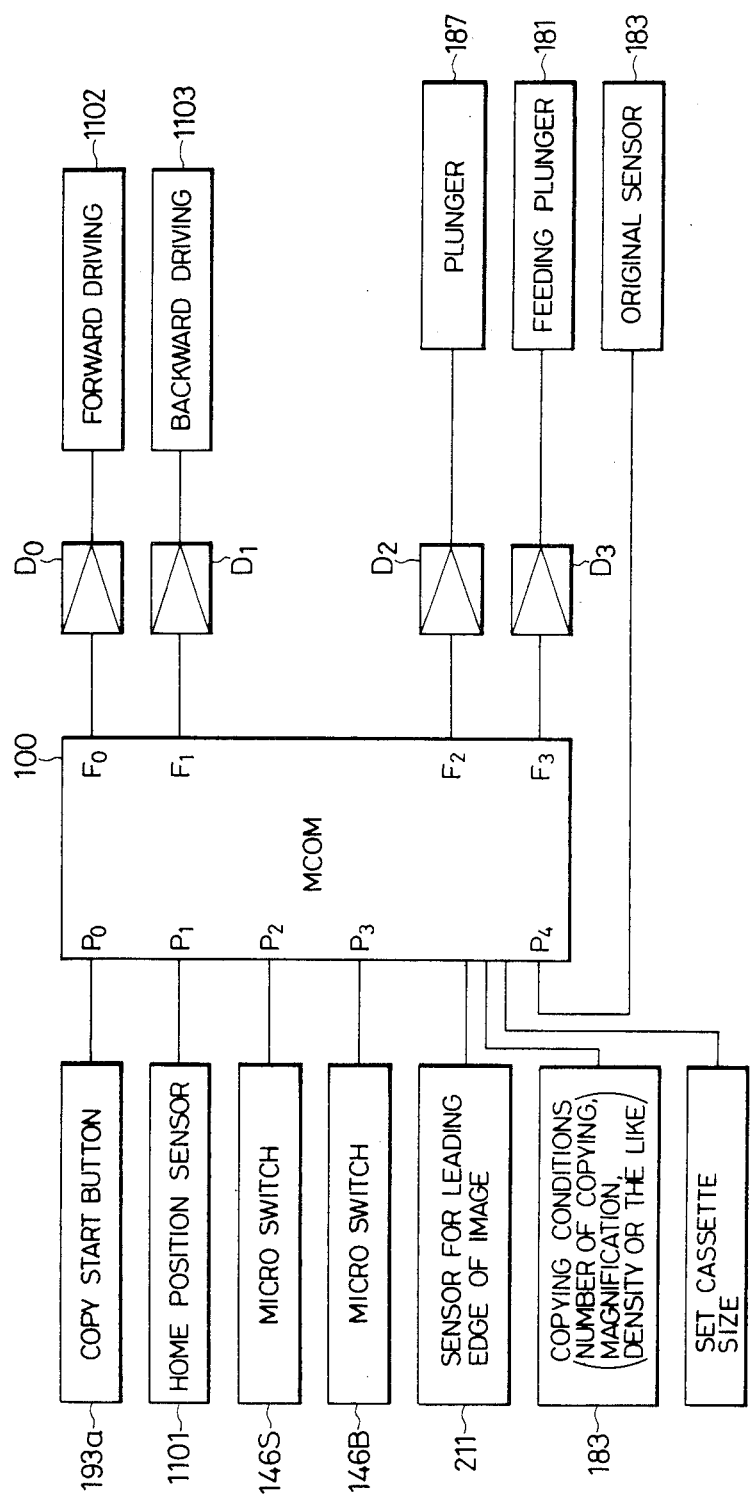
FIG. 28 is a block diagram of a control circuit.

In a state in which the original carriage 103 and the original feeding device 102 are positioned in the home position indicated by solid lines in FIGS. 13 and 14, it is assumed that the mode change-over lever 138 is pivoted clockwise about the shaft 107 as viewed in FIG. 15 and changed over to the position of the sheet mode S as indicated by solid line. A projection 138A of a sector 138E of the change-over lever 138 fits into a recess 143A (FIGS. 15 and 16) of a fixed member 143 fixed to the body 101. Thus, the original feeding device 102 becomes immovably restrained on the copying apparatus body 101 side. Also, by this change-over, a protrusion 138C of the change-over lever 138 closes a sheet mode detecting microswitch 146S mounted on the bottom plate 139 and the change-over to the sheet mode is detected, and the detection signal is input to a control circuit 100 (FIG. 28).

When the original carriage 103 and the original feeding device 102 deviate from their home position for some reason or other, they may be manually pushed to their home position. When the original carriage 103 becomes positioned in its home position, it is detected by a home position sensor (the sensor 1101 of the control circuit of FIG. 28).

On the other hand, with the change-over of the change-over lever 138 to the position of the sheet mode S, the shaft 107 and the opening-closing pivotable plates 142 secured to the shaft 107 rotate clockwise. Thus, the opening-closing pivotable plates 142 assume their upright posture as shown in FIG. 17. Therefore, the portion of the original feeding device 102 which is connected to the pivotable plates 142 through the link 140 and which is adjacent to the original carriage 103 is generally drawn toward the shaft 107 and the positioning rollers 126 ride onto the guide rail 124. Also, by the guides 129 riding onto the cams 128, the positioning of the original feeding device 102 with respect to the original carriage 103 in the direction of height is accomplished. In this state, there is created a gap 131 between a pressure sheet 130 provided in the original feeding device 102 and the original carriage 103.

Conversely, when the mode change-over lever 138 is rotatively operated counter-clockwise about the shaft 107 as viewed in FIG. 15 and changed over to the position of the book mode B as indicated by dots-and-dash line, the projection 138A of the sector 138E of the lever 138 becomes disengaged from the recess 143A of the fixed member 143 of the copying apparatus body 101. However, the projection 138B of the sector 138E of the lever 138 fits into the recess 144A of an original carriage fixing member 144 fixed to the original carriage 103. Thereby, the original feeding device 102 is released from its restraint with respect to the copying apparatus body 101 and conversely becomes restrained with respect to the original carriage 103. Also, by this change-over, the protrusion 138D of the change-over lever 138 closes a book mode detecting microswitch 146B mounted on the bottom plate 139 and the change-over to the book mode is detected, and the detection signal is input to the control circuit 100.

On the other hand, with the change-over of the change-over lever 138 to the position of the book mode B, the shaft 107 and the opening-closing pivotable plates 142 rotate counter-clockwise. Thus, the opening-closing pivotable plates 142 change from their upright posture to their prone posture as shown in FIG. 18. Therefore, the portion of the original feeding device 102 which is connected to the pivotable plates 142 through the link 140 and which is adjacent to the original carriage 103 is generally pushed away from the shaft 107. Thus, the positioning rollers 126 become disengaged from the guide rail 124 and the guides 129 become disengaged from the cams 128. As a result, the device 142 is changed from the position of FIG. 17 to a position in which the pressure sheet 130 is in contact with the surface of the original carriage 103 as shown in FIG. 18.

Pins 142a are studded on the outer sides of the leftmost and rightmost ones of the opening-closing pivotable plates 142 secured to the mode change-over shaft 107, as shown in FIGS. 20 and 21. A toggle spring 142b is extended between each pin 142a and the bottom plate 139. The change-over of the change-over lever 138 to the position of the sheet mode S or the position of the book mode B is maintained stably by the toggle springs 142b.

That is, in the case of the sheet mode S, the original feeding device 102 is restrained with respect to the copying apparatus body 101 and only the original carriage 103 is reciprocally moved. In this case, a sheet original is smoothly passed between the original carriage 103 and the pressure sheet 130 of the original feeding device 102. Also, during the reciprocal movement of the original carriage 103, the original feeding device 102 is displaced so as to create a gap 131 between the original carriage 103 and the pressure sheet 130 so that there is created no contact sliding load between the original carriage 103 and the pressure sheet 130. In the case of the book mode B, the original feeding device 102 is restrained with respect to the original carriage 103 and is moved forwardly with the original carriage 103. Design is made such that in this case, the original feeding device 102 is displaced in a direction in which the surface of the pressure sheet 130 contacts the surface of the original carriage 103, in order to bring a book original into an intimate contact with the surface of the original carriage 103.

Figures 22, 23:
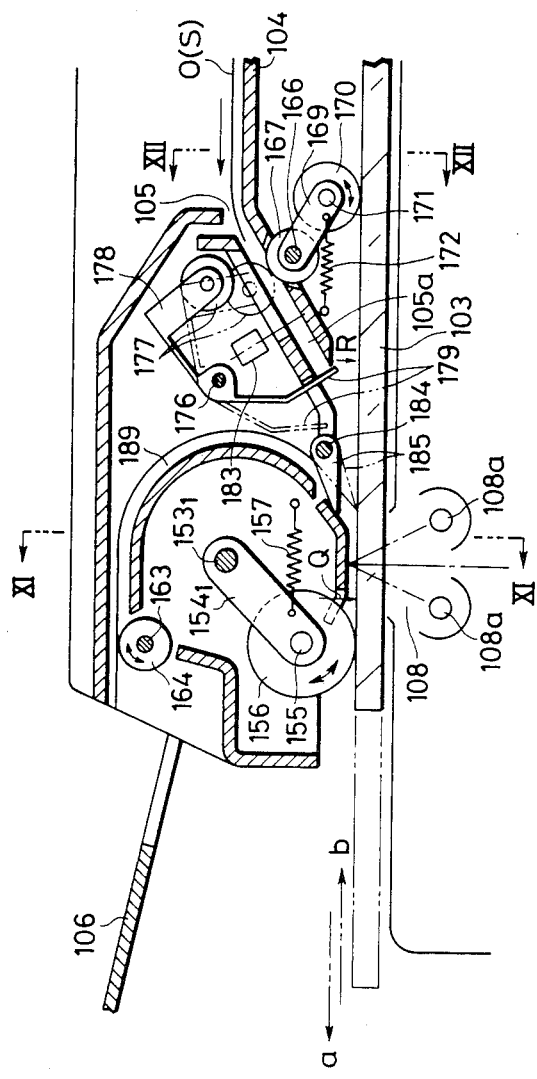
FIG. 22 is an enlarged cross-sectional view of a sheet original conveying and discharging roller mechanism portion.
FIG. 23 is a cross-sectional view taken along line XI—XI of FIG. 22.

FIG. 22 is an enlarged cross-sectional view of the original conveying and discharging roller mechanism portion of the original feeding device 102, FIG. 23 is a cross-sectional view taken along line XI—XI of FIG. 22, FIG. 24 is a cross-sectional view taken along line XII—XII of FIG. 22, and FIG. 25 is a rear view of a driving system.

In FIG. 23, reference numerals 151 and 152 designate the front side plate and the rear side plate, respectively, of the original feeding device 102. A front arm support shaft $153_1$ and a rear arm support shaft $153_2$ are secured to these side plates, respectively. Conveying roller arms $154_1$ and $154_2$ are pivotably supported on the arm support shafts $153_1$ and $153_2$, respectively. Further, a conveying roller 156 is secured to a conveying roller shaft 155. This conveying roller 156 is rotatably supported on the conveying roller arms $154_1$ and $154_2$. Conveying roller springs 157 (FIG. 22) are secured to the conveying roller arms $154_1$ and $154_2$, respectively, and urge the conveying roller 156 against the surface of the original carriage 103.

An original discharge driving arm 158 and an idler gear 159 (FIGS. 23 and 25) are supported on the rear arm support shaft $153_2$. A shaft 160 is secured to the original discharge driving arm 158. A roller 161 formed integrally with a gear 161a which is in mesh engagement with the idler gear 159 is rotatably supported on the shaft 160. A friction plate 162 is attached to the frame plate 125 in the direction of reciprocal movement of the original carriage 103. Furthermore, the roller 161 is in contact with the friction plate 162 and is rotatively driven by the reciprocal movement of the original carriage 103.

Reference numeral 163 designates an original discharge roller shaft having secured thereto a paper discharge roller 164 made of an elastic material such as sponge or the like and an original discharge gear 165. This original discharge gear 165 is in mesh engagement with the idler gear 159 and, with the reciprocal movement of the original carriage 103, rotation of the roller 161 is transmitted to the original discharge roller 164 through the gear 161a, the idler gear 159, the original discharge gear 165 and the shaft 163, whereby the roller 164 is rotated.

Reference numeral 166 (FIGS. 22, 24 and 25) designates an original feed roller shaft having secured thereto an original feed roller 167 and an original feed gear 168 The original feed roller shaft 166 is rotatably supported between the front side plate 151 and the rear side plate 152. An original keeping arm 169 is pivotably engaged with the original feed roller shaft 166. The original keeping arm 169 rotatably supports an original keeping roller shaft 171 having an original keeping roller 170 secured thereto. An original keeping spring 172 (FIG. 22) is secured to the original keeping arm 169 and urges the original keeping roller 170 against the surface of the original carriage 103.

An original feed shaft 174 is secured to an original feed driving arm 173 (FIGS. 24 and 25) pivotably supported on the original feed roller shaft 166. A gear 175a meshing with the original feed gear 168 and a roller 175 integral with the gear 175a are rotatably supported on the shaft 174. The roller 175, like the aforementioned roller 161, is in contact with the upper surface of the friction plate 162 and is rotatively driven with the reciprocal movement of the original carriage 103. The rotation of the roller 175 is transmitted to the original feed roller 167 through the gear 175a, the gear 168 and the shaft 166, whereby the roller 167 is rotatively driven.

That is, as will be described later, in the case of the sheet mode, the conveying roller 156 and the original keeping roller 170 for keeping a sheet original against the surface of the original carriage 103 merely roll on the surface of the original carriage 103 with the reciprocal movement of the original carriage 103 and hold down the original on the surface of the original carriage. Also, the original discharge roller 164 and the original feed roller 167 are provided discretely from the conveying roller 156 and the original keeping roller 170, respectively, and receive the power transmission from the rollers 161 and 175 for converting the forward movement of the original carriage 103 into rotational movement, whereby the rollers 164 and 167 are rotatively driven. With such construction, the original is conveyed with the original carriage 103 without slipping relative to the surface of the original carriage.

Reference numeral 176 (FIG. 22) designates an original feed pivotable shaft. A plate spring 178 supporting an original feed roller 177 and a registration shutter 179 are integrally provided on the shaft 176. Also, an original feed pivotable arm 180 (FIG. 25) is secured to the original feed pivotable shaft 176. This original feed pivotable arm 180 is engaged with an original feed plunger link 182 which in turn is engaged with an original feed plunger 181, and may be pivoted about the shaft 176 by ON-OFF of the original feed plunger 181. Thus, when the original feed plunger 181 is in its OFF state, the plate spring 178 and the registration shutter 179 are held in their first posture indicated by solid lines in FIG. 22, and when the original feed plunger 181 is in its ON state, the plate spring 178 and the registration shutter 179 are held in their second posture indicated by dots-and-dash lines in FIG. 22. When the plate spring 178 and the registration shutter 179 are in their first posture, the original feed roller 177 is raised upwardly from the aforementioned original feed roller 167 and belt at the raised position and further, the fore end portion of the registration shutter 179 is positioned at the sheet original outlet portion of a sheet path 105a leading from the original feed port 105 to the original carriage 103 and thus, the sheet original outlet portion is closed. Also, when the plate spring 178 and the registration shutter 179 are in their second posture, the original feed roller 177 lowers relative to the original feed roller 167 and is held in contact with the original feed roller 167 and the fore end portion of the registration shutter 179 escapes from the sheet original outlet portion of the sheet path 105a and thus, the sheet original outlet portion is kept open.

Reference numeral 183 (FIG. 22) designates a reflection type optical sensor for detecting the presence of an original which is disposed in the sheet path 105a.

Reference numeral 184 denotes a sheet original scraping shaft. A sheet original scraping sheet 185 is attached to and supported by this shaft 184. As will be described later, in the case of the sheet mode, this scraping sheet 185 serves to separate a read sheet original from the original carriage 103. Reference numeral 186 (FIG. 25) designates a scraping pivotable arm secured to the scraping shaft 184. This arm 186 is engaged with a scraping plunger link 188 which in turn is engaged with a scraping plunger 187, and is pivoted about the shaft 184 by ON-OFF of the scraping plunger 187. Thus, when the plunger 187 is in its OFF state, the fore end portion of the scraping sheet 185 is held in a first posture indicated by solid line in FIG. 22 in which it is separated from the surface of the original carriage 103, and when the plunger 187 is in its ON state, the fore end portion of the scraping sheet 185 is held in a second posture in which it is in contact with the surface of the original carriage 103 as indicated by dots-and-dash line. The scraping sheet 185 is formed of an elastic sheet-like substance such as a Mylar sheet (a trade name of polyethylene terephthalate sheet) so as to uniformly contact the surface of the original carriage 103 over the full width thereof.

By being thus formed of an elastic sheet-like material 185, the sheet original scraping means can reliably and smoothly separate a sheet original in intimate contact with the original carriage 103 without injuring the original.

With regard to this sheet original scraping sheet 185, if the contact line of the sheet 185 relative to the surface of the original carriage 103 is perpendicular to the direction of reciprocal movement of the original carriage 103, the end surface of the edge portion of the full width of the sheet original may strike against the end surface of the fore end portion of the scraping sheet 185 over the full width thereof at a time and this may create a shock in the original to thereby injure the end portion of the original or deviate the original. Therefore, in the present embodiment, as shown in FIG. 26, the contact line 301 between the scraping sheet 185 and the original carriage 103 has a certain angle θ with respect to a direction 303 perpendicular to the direction 302 of reciprocal movement of the original carriage. That is, the angle θ is provided so that the original O(S) may smoothly strike against the scraping sheet 185 and may be scraped thereby. Particularly, the corner portion 304 which strikes against the scraping sheet at first is provided with a greater angle θ'.

By thus mounting the scraping means at an angle with respect to the line of the end portion of the original so that the original may not strike against the scraping means over the full width thereof at a time, the original can always be smoothly scraped from the original carriage.

Also, as regards the positional relation in the direction of depth between the scraping sheet 185 and the original, the wall on the inner side of the original feed tray is constructed so that the inner end of the original lies without fail on the portion 304 of the scraping sheet 185 which has a sharp angle.

On the surface of the platen glass 103 which is the original carriage, as indicated by reference character 103a in FIG. 27, there is formed a layer of such a transparent material (a friction sheet layer) that the coefficient of friction between the original O(S) and the original carriage is greater the coefficient of friction between the original O(S) and the conveying roller 156 or the original keeping roller 170 which is the auxiliary means for urging the original against the surface of the original carriage 103. This layer 103a may be formed by laminating a transparent Mylar sheet as thin as not to affect the image. Alternatively, the surface of the original carriage 103 may be directly coated with a material having a high coefficient of friction, such as a film of ITO(indium oxide salt).

By forming such a layer 103a, the original is not in an intimate contact with the original carriage due to the friction force thereof with respect to the layer of said material and therefore will never become deviated even if the apparatus vibrates and the original keeping means vitrates ralative to the original carriage.

The material of the transparent original carriage 103 is not limited to glass, but any material such as transparent plastic usable as the original carriage is applicable.

A. Sheet Original Processing (Sheet Mode)

(1) The original discharge tray 106 is pivoted to the left side of the original feeding device 102 about the hinge portion 106a (FIG. 13), as indicated by solid line in FIGS. 13, 14 and 22. In a state in which the original carriage 103 and the original feeding device 102 are positioned at their home position, the mode changeover lever 138 is brought to the position of the sheet mode S. Thus, as previously described, the original feeding device 102 is immovably restrained with respect to the copying apparatus body 101 (FIG. 15). At that time, the microswitch 146S is closed and the changeover to the sheet mode is input to the control circuit 100. The original feed plunger 181 is in its OFF state and accordingly, the plate spring 178 and the registration shutter 179 are kept in the first posture indicated by solid lines in FIG. 22, and the original feed roller 177 is raised upwardly from the original feed roller 167 and held in the raised position. The sheet original outlet portion of the sheet path 105a is closed by the registration shutter 179. The scraping plunger 187 is in its OFF state and accordingly, the scraping sheet 185 is held in the first posture indicated by solid line in FIG. 22 in which the fore end portion thereof is spaced apart from the surface of the original carriage 103.

(2) A sheet original O(S)(FIG. 14) to be copied is placed onto the original feed tray 104 of the original feeding device 102 with the image bearing surface of the original to be copied facing downward, and the leading end portion of the original is inserted from the original feed port 105 into the sheet path 105a until the leading end edge of the original strikes against the registration shutter 179. This insertion of the original is detected by the sensor 183 and a signal representative of the presence of the original is input to the control circuit 100.

(3) The number of copies, the size of the paper, the copying magnification, the copy image density and other copying conditions are set by means of the operating panel 193 of the copying apparatus body 101. Those set conditions are input to the control circuit 100. The copy start button 193a is then depressed.

(4) The forward movement a of the original carriage 103 is started. Simultaneously therewith, the original feed plunger 181 is energized and the original feed roller 177 is urged against the original feed roller 167 with the leading end portion of the original which is inserted in the sheet path 105a being held therebetween. The registration shutter 179 is opened (the second posture indicated by dots-and-dash line in FIG. 22). With the forward movement a of the original carriage 103, the original feed driving roller 175 rolls on the friction plate 162 and the rotational force thereof is transmitted to the original feed roller 167, whereby the roller 167 begins to rotate in a direction to draw in the original. By the rotational force of this original feed roller 167, the original is synchronously conveyed from the sheet path 105a to the surface of the original carriage 103 at the same speed as the speed of the forward movement of the original carriage 103. The original is conveyed with the original carriage 103 in the direction of forward movement of the original carriage 103 without slipping relative to the surface of the original carriage while being brought into an intimate contact with the surface of the original carriage 103. The original being thus conveyed passes through the slit exposure station 108 with the original carriage 103, and then is further conveyed by the conveying roller 156 while being urged against the surface of the original carriage 103. By the original thus passing through the slit exposure station 108 with the original carriage 103, the downwardly facing image bearing surface of the original is slit-exposed in succession from the leading end edge to the trailing end edge of the original, and the aforedescribed copying of the image of the original is executed by the copying mechanism in the copying apparatus body 101.

When the conveyance of the original progresses with the forward movement a of the original carriage 103 and the trailing end edge of the original passes the sensor 183, the passage is detected by the sensor 183 and the detection signal is input to the control circuit 100. Thereupon, a timer circuit is started with the signal point of time as the starting point. In this timer circuit, the required conveyance time from said signal point of time until the original is conveyed with the forward movement of the original carriage and the trailing end edge of the original passes through the slit exposure station 108 and arrives at a position Q slightly on this side of the conveying roller 156 (a position through which the trailing end edge of the original does not completely pass as viewed in FIG. 22) is preset as a timer time. Thus, at a point of time whereat the predetermined timer time has elapsed after the passage of the trailing end edge of the original through the position of the sensor 183 has been detected by the sensor 183, the forward movement a of the original carriage 103 is stopped. Accordingly, during the time from after the forward movement of the original carriage 103 has been started until the forward movement is stopped as described above, the original passes through the slit exposure station 108 and the entire surface thereof is subjected to the exposure process.

That is, the length (size) in the direction of feeding of the original fed from the original feeding device 102 onto the original carriage 103 is detected by the sensor 183 and the timer, and in accordance therewith, the length of the forward movement stroke of the original carriage 103 is controlled. That is, the forward movement of the original carriage 103 is controlled to a necessary forward movement distance corresponding to the size of the original. Accordingly, there are no wasteful operation and wasteful operation time of the original carriage 103, and the time required for one process cycle of the original is shortened.

The original carriage 103 whose forward movement a has been stopped is subsequently turned to the backward movement b, and the exposed original is conveyed backwardly with the original carriage 103 while being held down by the conveying roller 153. Where the preset number of copies is one(single copy), the scraping plunger 187 is energized simultaneously with the start of the backward movement of the original carriage 103 and the scraping sheet 185 is changed over to the second posture indicated by dots-and-dash line in FIG. 22 wherein the fore end portion thereof is in contact with the surface of the original carriage 103. Thus, the exposed original is guided from the surface of the original carriage 103 into the sheet path 189 by the scraping sheet 185 and goes into the sheet path 189 with the backward movement b of the original carriage 103. With this backward movement of the original carriage 103, as previously described, the original discharge roller 164 is rotatively driven in the original discharge direction by the rolling of the original discharge driving roller 161 on the friction plate 162. The exposed original having entered the sheet path 189 is further conveyed by the original discharge roller 164 and is discharged onto the original discharge tray 106 with the exposed image bearing surface thereof facing upward during the time until the original carriage 103 returns to its home position. The original carriage 103 having returned to its home position assumes the stand-by position until the next original is set and the copy start button 193a is depressed.

On the copying apparatus body 101 side, as described above, one copy cycle is terminated by the time when the original has been discharged onto the original discharge tray 106, and a copy is discharged onto the copy tray 121 with the image bearing surface thereof facing upward. That is, both the original and the copy are discharged onto the original discharge tray 106 and the copy tray 121, respectively, with the image bearing surfaces thereof facing upward.

Where the preset number of copies is plural (multicopy), the scraping plunger 187 is kept in its OFF state even when the backward movement b of the original carriage 103 is started. That is, the scraping sheet 185 continues to be kept in the first posture in which the fore end portion thereof remains spaced apart from the original carriage 103. Accordingly, in this case, when the original carriage 103 is moved backwardly, the original thereon is conveyed into the gap portion 131 between the original carriage 103 and the pressure sheet 130 of the original feeding device 102 with the original carriage 103. In the course of this conveyance, the original is held down against the surface of the original carriage 103 by the original keeping roller 170 and is further conveyed with the backwardly moving original carriage 103. Thereafter, the original carriage 103 is moved backward to its home position and stopped at this position. Subsequently, the original carriage 103 is again turned to the forward movement a. Since the distance between the conveying roller 156 and the original keeping roller 170 is shorter than the minimum length of the original, the original on the original carriage 103 is held down against the surface of the original carriage 103 by at least one of these rollers in the backward movement stroke of the original carriage 103 without fail. Also, even at a point of time whereat the original carriage 103 has been moved back to its home position, the leading end edge of the original lies at the position R of FIG. 22 and the original is held down against the surface of the original carriage 103 by the original keeping roller 170 and therefore, nc slippage of the original relative to the surface of the original carriage occurs.

Thus, with the second forward movement a of the original carriage 103, the original thereon is conveyed in the forward direction and passes through the slit exposure portion 108, in which the second exposure process is effected, and the second copying process is executed on the copying apparatus body 101 side. Each of the second and subsequent forward movements of the original carriage 103 is effected by the forward movement length for the first copying process which is stored in the control circuit 100. Theereafter, the forward movement of the original carriage 103 is repeated for the set number of copies, whereby the slit exposure of the original is repeated and the set number of copies are successively discharged onto the copy tray 121 with the image bearing surfaces thereof facing upward.

When the last forward movement a of the original carriage 103 is terminated and the original carriage 103 is turned to the backward movement b, the scraping plunger 187 is energized and thereafter, the original is discharged onto the original discharge tray 106 with the image bearing surface thereof facing upward as in the case of the single copy operation. The original carriage 103 finally moved back to its home position assumes the stand-by position until the next original is set and the copy start button 193a is depressed. The plate spring 178 and the registration shutter 179 are returned to their first posture by the deenergization of the original feed plunger 181, and the scraping sheet 185 is also returned to its first posture by the deenergization of the scraping plunger 187.

FIG. 28 is a block diagram showing a circuit for effecting the above-described operation. This circuit is comprised chiefly of a well-known one-chip microcomputer (hereinafter referred to as MCOM) 100 containing ROM, RAM, etc. therein, and the signals from the copy start button 193a, the home position sensor 1101 for detecting whether the original carriage 103 of the copying apparatus is in a predetermined position, the sheet and thick original change-over micrcswitches 146S, 146B, the image end signal sensor 211 for producing the timing at which the leading end of the image is exposed to light and the original detecting sensor 183 in the original feeding device 102 and signals representative of various copying conditions such as the number of copies, the copying magnification, the image density, etc. are input to the input ports $P_0$–$P_4$ of MCOM 100.

Also, output signals for ON-OFF-operating a forward movement driving mechanism 1102 and a backward movement driving mechanism 1103 for driving the original carriage 103 which is a load, the scraping plunger 187 and the original feed plunger 181 in the original feeding device are put out from output ports $F_0$–$F_3$ through drivers $D_0$–$D_3$, respectively.

The reading of these input signals or ON-OFF of the load is controlled in accordance with a program stored in the ROM in MCOM 100. That is, upon setting of the change-over lever 138 to the sheet mode S, the switch 146S is closed (the step 1105 of FIG. 29A). When a sheet original O (S) is inserted from the original feed port 105 along the tray 104 until the leading end edge thereof strikes against the shutter 179, the optical sensor 183 detects the presence of the original sheet (step 1106). Then, the sheet mode copying operation is started by depressing the start button 193a (step 1107), whereby the forward movement of the original carriage 103 is started and the original feed plunger 181 is energized (the shutter 179 is opened)(the step 200 of FIG. 29B).

At step 201, the forward movement timer is started, and then terminated, and the forward movement of the original carriage is stopped.

If at step 202, (the set number of copies) $-1 \neq 0$, the scraping plunger 187 is deenergized and the backward movement of the original carriage is started.

At step 203, the home position of the original carriage is detected and the backward movement thereof is stopped.

If at step 204, (the set number of copies) $-1 = 0$, the scraping plunger 187 is deenergized and the copying operation is terminated (END).

When plural copies are to be produced, at step 202, the scraping plunger 187 is rendered inoperative (OFF) and for the number of copies $\neq 0$ at step 204, the program returns to step 201, and the operation is repeated until the number of copies becomes 0.

Figure 29A:
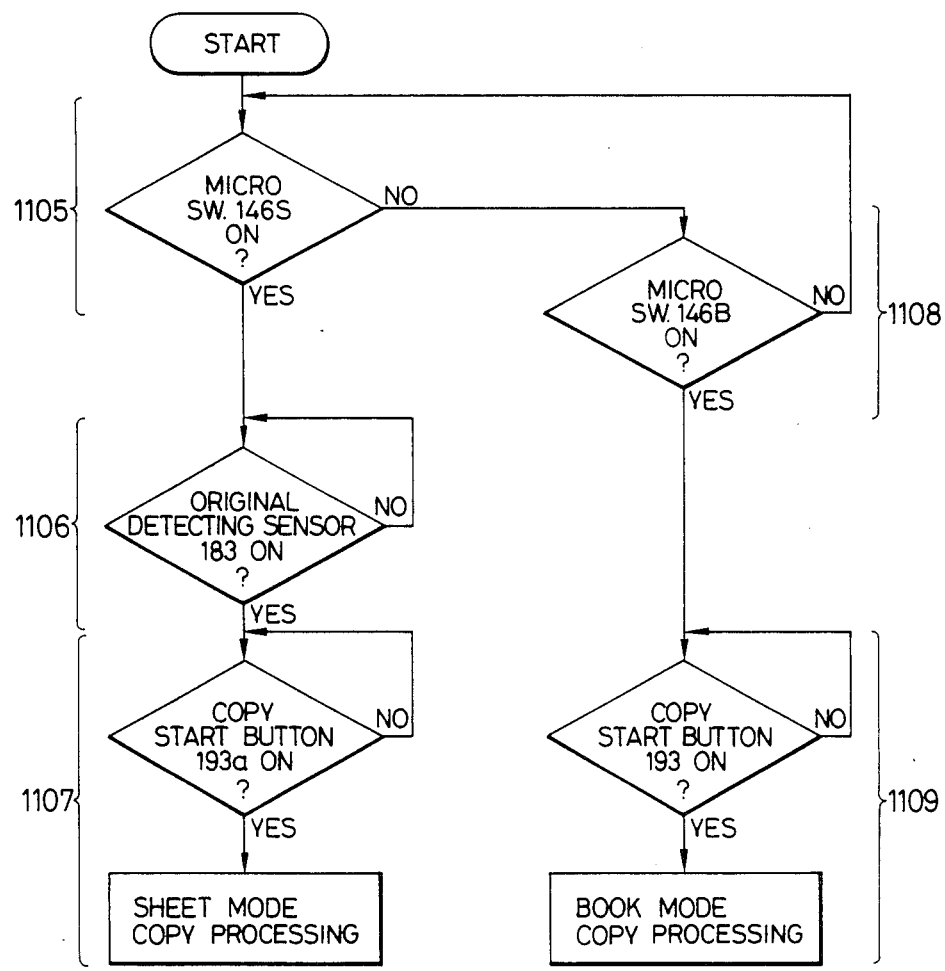
FIGS. 29A and 29B are flow charts thereof.
Figure 29B:
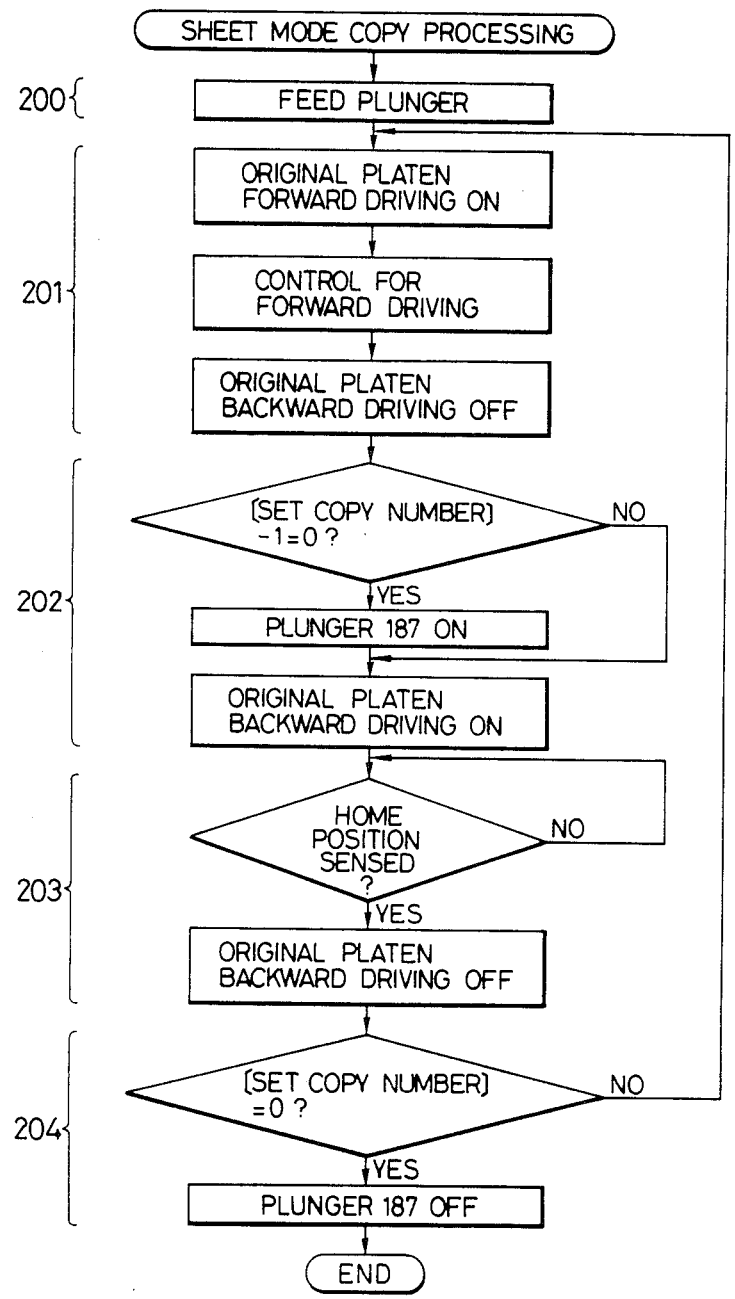

The forward driving control of step 201 will now be described in detail by reference to FIGS. 29C–29E.

Step 201=Forward Driving Control

Figure 29C:
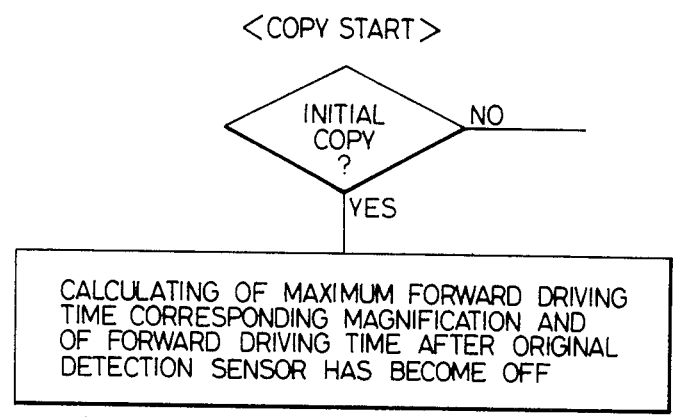
Figure 29D:
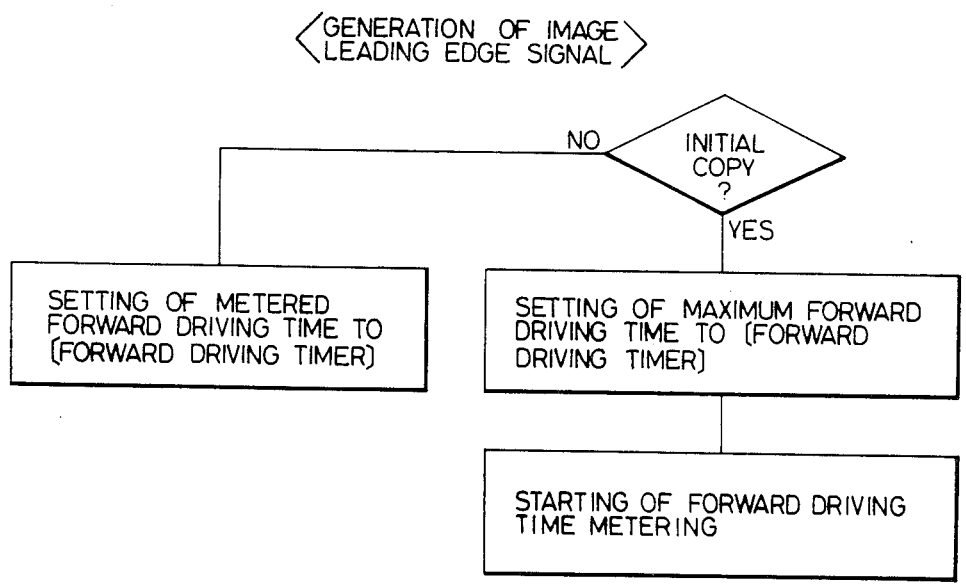

1. [Start of Copying] At a point of time whereat copying is started, the size of the original is unknown and therefore, the maximum forward driving time corresponding to the magnification and the time necessary for moving the original carriage by the distance between the position of the original detection sensor 183 and the exposure position are found (FIG. 29C).

2. [Generation of Image Leading Edge Signal] By movement of the original carriage 103, the image leading edge sensor generates a timing signal corresponding to the leading edge of the image. The program shown in FIG. 29D is operated by this signal. That is, whether the copy is a first copy is judged and if it is the first copy, the maximum time found in FIG. 29C is set to the [forward driving timer9 and at the same time, measurement of the forward driving time is started. In the case of continuous copying, the measured value of the timer shown in FIG. 29E is set to the [forward driving timer].

Figure 29E:
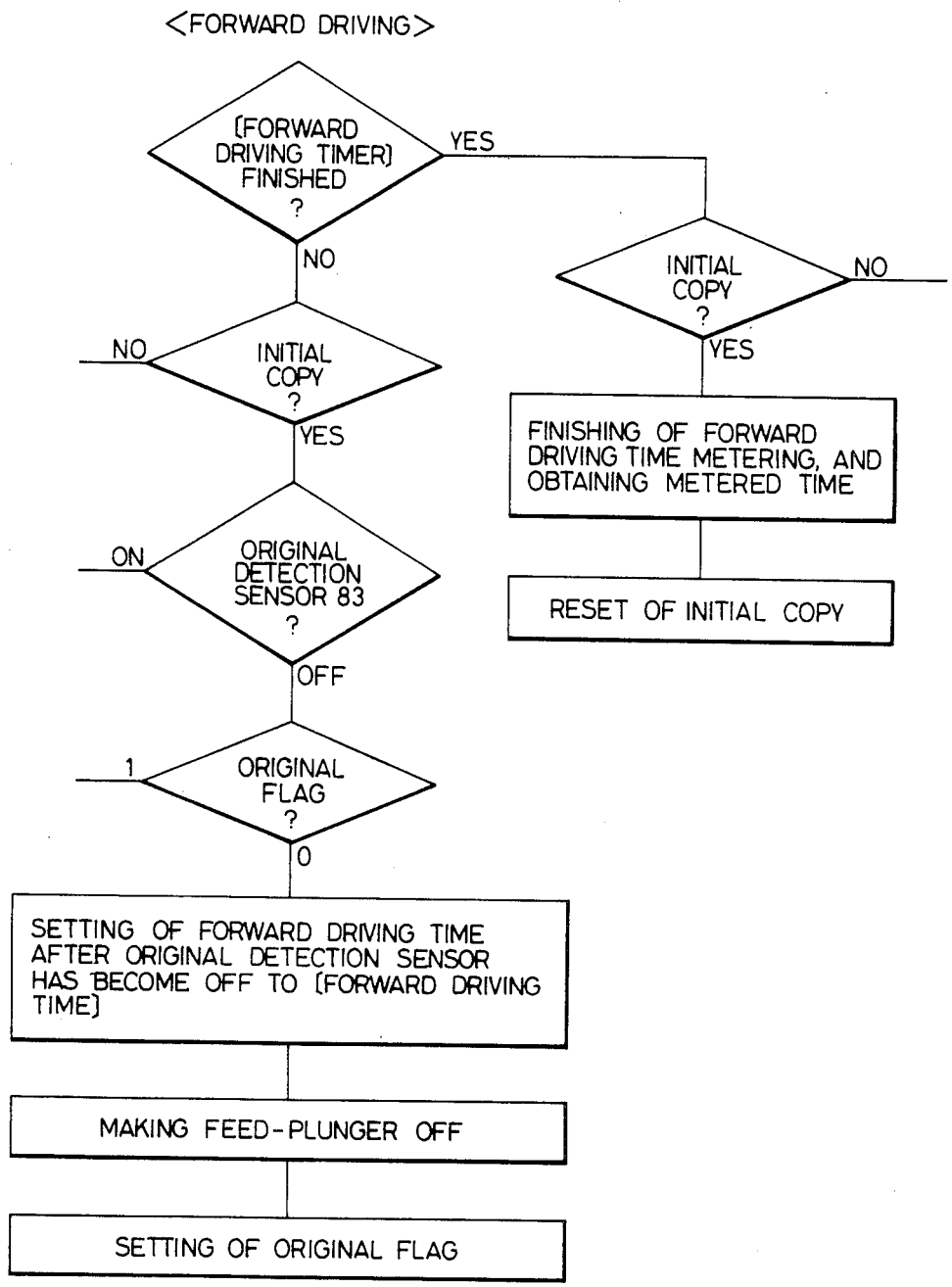

3. [Forward Driving ] As shown in FIG. 29E whether the forward driving timer has been finished is judged. If it has not been finished (that is, it is forwardly driving), whether the copy is the first copy is judged and if it is the first copy, detection of the trailing end edge of the original is effected by the original detection sensor 183, and by the sensor 183 becoming OFF, the trailing end edge of the original can be detected. The time FIG. 29C until the trailing end edge of the original arrives at the exposure station at this timing is set to the [forward driving timer]. Then, the original flag is set. Also, when the [forward driving time] is finished, whether the copy is the first copy is judged and if it is the first copy, the metering timer is stopped, and the time for continuous copying is found and the flag of the initial copy is reset.

B. Thick Original Processing (Book Mode)

(1) The original discharge tray 106 is folded on the original feed tray 104 as indicated by dots-and-dash lines in FIG. 13. The mode change-over lever 138 is brought to the position of the book mode B. Thereby, as previously described, the original feeding device 102 is restrained with respect to the original carriage 103, and the original carriage 103 and the original feeding device 102 become capable of being forwardly and backwardly movable together with each other. As shown in FIG. 18, the pressure sheet 130 of the original feeding device 102 is brought into an intimate contact with the upper surface of the original carriage 103. The microswitch 146B is closed and the change-over to the book mode is input to the control circr:it 100. In this mode, the original feed plunger 181 and the scraping plunger 187 are always kept in their OFF state.

(2) The original feeding device 102 is opened about the shaft 145 with respect to the upper surface of the original carriage 103 as indicated by dots-and-dash lines in FIG. 18, and a thick original O(B) to be copied is placed at a predetermined position on the surface of the original carriage 103 with the image bearing surface thereof which is to be copied facing downward, and the opened device 102 is brought down as the original keeping means onto the original, as shown in FIG. 19.

(3) Necessary various copying conditions (designation of the cassette size, etc.) are set by means of the operating panel 193 of the copying apparatus body 101, and then the copy start button 193a is depressed.

(4) Thereupon, the original carriage 103 starts its forward movement a with the thick original O(B) and the original feeding device resting thereon. By this forward movement a of the original carriage 103, the downwardly facing image bearing surface of the thick original set on the original carriage passes through the slit exposure station 108, in which said image bearing surface is exposed to light and thus, the copying of the image of the original is executed by the copying mechanism in the copying apparatus body 101.

The original carriage 103 is turned to the backward movement at a point of time whereat it has effected the forward movement a by a distance corresponding, for example, to the size of the copy paper used, and then returns to its home position, and in the case of single copy, the original carriage assumes the stand-by position thereafter, while in the case of multi copy, the original carriage repeats its reciprocal movement a number of times corresponding to the set number of copies, whereafter it assumes the stand-by position.

Figure 30A:
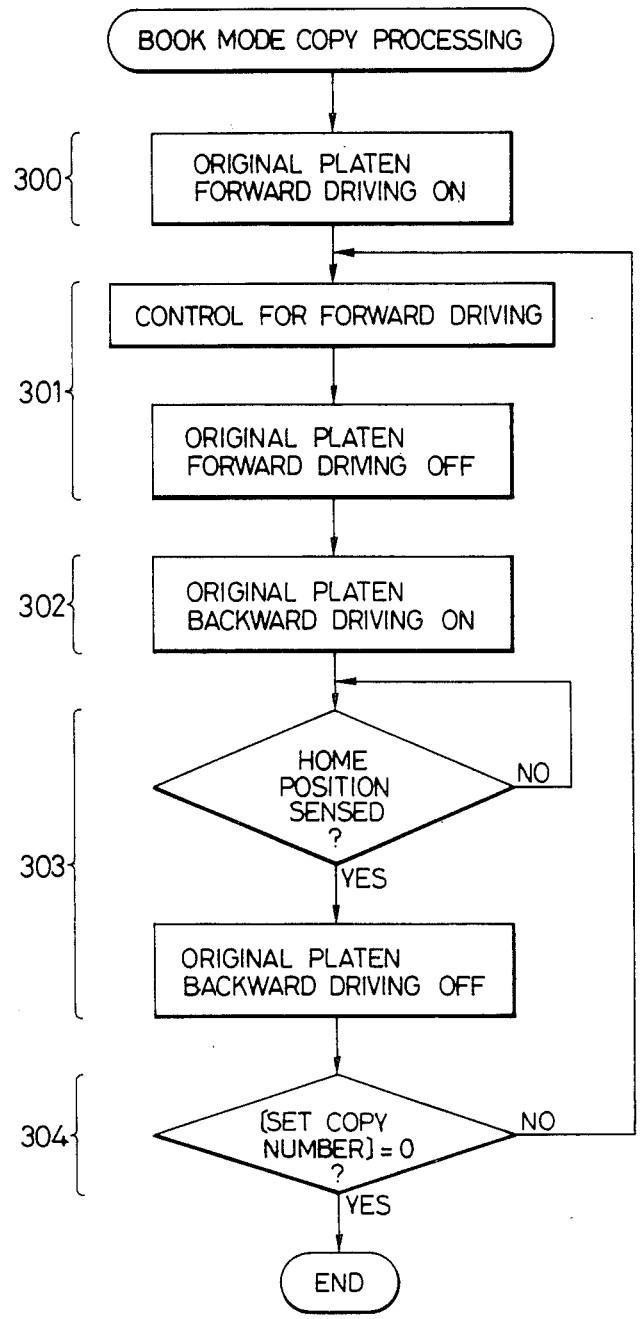

Reference is now had to FIGS. 30A–30C to describe the control for moving the original carriage 103 by a distance corresponding to the size of the cassette containing copy paper therein. A cassette size signal is input to the microcomputer 100 by depressing a cassette size button (not shown).

Upon setting of the change-over lever 138 to the book mode B, the switch 146B is closed (the step 1108 of FIG. 29A). A book original is placed at a predetermined position on the original carriage 103, whereafter the original feeding device 102 is brought down to urge the book original against the original carriage 103. Then, by the start button 193a, the book mode copying operation is started (step 1109) and the forward driving of the original carriage is started (the step 300 of FIG. 30A).

At step 301, the forward driving timer is started and finished, and the forward driving of the original carriage is stopped.

At step 302, the backward driving of the original carriage is started.

At step 303, the home position of the original carriage is detected and the backward driving thereof is stopped.

If at step 304, (the set number of copies) $-1=0$, the copying operation is terminated (END).

Further, the control for forward driving of step 301 will be described in detail by reference to FIGS. 30B and 30C.

Step 301=Control for Forward Driving

1. [Start of Copying] The copying magnification and the forward driving time corresponding to the size ot the cassette are found.

2. [Generation of Image Leading Edge Signal] The measured timer value shown in FIG. 30B is set to the [forward driving timer] when copying is started.

As described above, in the present embodiment, the control mode for controlling the amount of movement of the original carriage 103 can be changed over in response to the mode change-over means which changes over the mode to the sheet mode and the book mode. That is, in the case of the sheet mode, the amount of movement of the original carriage is controlled in accordance with the size of the original and, in the case of the book mode, the amount of movement of the original carriage is controlled in accordance with the designated cassette size.

As described above, the present invention provides an original feeding device which can cope with sheet originals and thick originals.

We claim:

1. An image forming apparatus comprising:
   an original carriage reciprocally movable with respect to a main body of said image forming apparatus to guide an original to an optical processing station;
   a frame member having conveying means capable of conveying the original in synchronism with movement of said original carriage, said frame member being openable and closable relative to said original carriage;
   mode change-over means for causing said frame member to engage the main body of said apparatus so as to keep the frame member stationary when a first mode is selected, and causing said frame member to be movable with said original carriage while associated with the movement of said original carriage when a second mode is selected,
   said original being guided to the optical processing station in the first mode by moving said conveying means by the movement of said original carriage and in the second mode by mounting the original on said original carriage, covering the mounted original by said frame member and thereafter moving said frame member together with said original carriage; and image forming means for forming on a sheet an image corresponding to the image of the original subjected to an optical process at said optical processing station.

2. An apparatus according to claim 1, wherein said optical processing station is an exposure station.

3. An apparatus according to claim 1, wherein said conveying means is a roller.

4. An apparatus according to claim 1, wherein said original carriage is a platen glass.

5. An apparatus according to claim 1, wherein said change-over means has a lever and a movable coupling member engaging either the main body of said apparatus or said original carriage in accordance with the change-over of said lever.

6. An apparatus according to claim 1, wherein an amount of movement of the original carriage is controlled in the first mode in accordance with a size of the original and in the second mode in accordance with a size of a copy sheet.

7. An apparatus according to claim 6, wherein the size of the copy sheet is detected upon insertion of a cassette into said apparatus.

8. An apparatus according to claim 1, further comprising detecting means for detecting a length of the original conveyed thereto, and control means for varying an amount of the movement of the original carriage in accordance with the length of the original detected by said detecting means.

9. An apparatus according to claim 1, further comprising discharge means for discharging from said original carriage the original passed through the optical processing station with the original being inverted by return movement of the original carriage in the first mode.

10. An apparatus according to claim 9, further comprising a pawl selectively advanced into a path of the original to guide the original to a discharge path.

11. An apparatus according to claim 10, wherein said discharge path inverts the original.

12. An apparatus according to claim 1, further comprising means disposed on the frame member to face the original carriage for causing the original to be located along the surface of said original carriage, and means for lowering said causing means in the second mode.

13. An apparatus according to claim 12, wherein said lowering means is operated in synchronism with the change-over operation of said mode change-over means.

14. An apparatus according to claim 12, further comprising a foldable discharge tray for receiving the original discharged from the optical processing station, wherein said lowering means is operated in synchronism with the folding operation of the discharge tray.

15. An apparatus according to claim 1, wherein:
   said frame member is so supported as to be openable and closable, and movable horizontally;
   a projection is provided such that said frame member runs on said projection when moved horizontally in one direction and disengages from said projection when moved horizontally in the direction opposite to said one direction; and
   said frame member is moved in said opposite direction upon selection of the second mode to cause the clearance between said frame member and said original carriage to become narrower, and moved in said one direction upon selection of the first mode to cause said clearance to broaden.

16. An apparatus according to claim 1, wherein said frame member comprises an original feed port, a shutter stopping a leading end of the original inserted through said feed port, detecting means for detecting the original inserted through said feed port, a roller provided between said feed port and said shutter, urging means for causing said shutter to move back and urgining said roller against the original when the insertion of the original is detected by said detecting means, and means for transmitting the movement of said original carriage to said roller to rotate said roller.

17. An apparatus according to claim 1, wherein said frame member comprises an original feed port, a shutter stopping a leading end of the original inserted through said feed port, a roller provided between said feed port and said shutter, urging means for causing said shutter to move back in synchronism with the movement of said original carriage and urging said roller against the original, and means for transmitting the movement of said original carriage to said roller to rotate said roller.

18. An apparatus according to claim 1, wherein said frame member is provided with an original keeping sheet moving in synchronism with the movement of said original carriage and pinching the original conveyed by said conveying means in cooperation with said original carriage.

19. An apparatus according to claim 1, wherein said frame member is supported openably and closably, and movably in a direction of thickness of the original in accordance with the thickness.

20. An apparatus according to claim 19, wherein said frame member is supported at two locations by a pivotable link.

21. An apparatus according to claim 1, wherein said first mode is a sheet mode and said second mode is a book mode.

* * * * *

UNITED STATES PATENT AND TRADEMARK OFFICE
CERTIFICATE OF CORRECTION

PATENT NO. : 4,660,957

DATED : April 28, 1987

INVENTOR(S) : NORIYOSHI UEDA, ET AL.

Page 1 of 3

It is certified that error appears in the above-identified patent and that said Letters Patent is hereby corrected as shown below:

COLUMN 4

Line 42, "$V_b$" should read --b'--.
    Line 55, "17 and a" should read --17a and--.

COLUMN 5

Line 51, "position" should read --portion--.

COLUMN 7

Line 61, "an other" should read --another--.

COLUMN 11

Line 64, "temporally" should read --temporarily--.

COLUMN 12

Line 48, "hereafter" should read --hereinafter--.
    Line 61, "designates" should read --designate--.

COLUMN 15

Line 22, "168" should read --168.--

COLUMN 16

Lines 15-16, "originaI" should read --original--.
    Line 17, "criginal" should read --original--.

UNITED STATES PATENT AND TRADEMARK OFFICE
CERTIFICATE OF CORRECTION

PATENT NO. : 4,660,957

DATED : April 28, 1987

INVENTOR(S) : NORIYOSHI UEDA, ET AL.

It is certified that error appears in the above-identified patent and that said Letters Patent is hereby corrected as shown below:

COLUMN 17

Line 28, "greater the" should read --greater than the--.
    Line 43, "ralative" should read --relative--.

COLUMN 18

Line 34, "roIler" should read --roller--.

COLUMN 20

Line 26, "nc" should read --no--.
    Line 35, "fcrward" should read --forward--.
    Line 36, "ty" should read --by--.
    Line 38, "Theereafter," should read --Thereafter,--.
    Line 67, "micrcswitches" should read --microswitches--.

COLUMN 21

Line 63, "timer9" should read --timer]--.

COLUMN 22

Line 30, "circr:it" should read --circuit--.
    Line 32, "state" should read --state.--.
    Line 62, "multi copy," should read --multi-copy,--.

COLUMN 23

Line 29, "ot" should read --of--.

UNITED STATES PATENT AND TRADEMARK OFFICE
CERTIFICATE OF CORRECTION

PATENT NO. : 4,660,957

DATED : April 28, 1987

INVENTOR(S) : NORIYOSHI UEDA, ET AL.

It is certified that error appears in the above-identified patent and that said Letters Patent is hereby corrected as shown below:

COLUMN 24

Line 5, "image" should begin a new paragraph.

COLUMN 25

Line 11, "urgining" should read --urging--.

Signed and Sealed this

Second Day of February, 1988

*Attest:*

DONALD J. QUIGG

*Attesting Officer*    *Commissioner of Patents and Trademarks*